United States Patent
Lee et al.

(10) Patent No.: US 9,277,022 B2
(45) Date of Patent: Mar. 1, 2016

(54) GUIDED WORKFLOWS FOR ESTABLISHING A WEB PRESENCE

(71) Applicant: Endurance International Group, Inc., Burlington, MA (US)

(72) Inventors: James Christopher Lee, Highland, UT (US); Benjamin John Merrill, Park City, UT (US); Paul Todd Seamons, Pleasant Grove, UT (US); Michael Evan Kesselman, Newton, MA (US); Hari Ravichandran, Lexington, MA (US); Mark Moseley, Lexington, MA (US); Scott Lovell, Malden, MA (US); Brian Brock, Taunton, MA (US)

(73) Assignee: Endurance International Group, Inc., Burlington, MA (US)

(*) Notice: Subject to any disclaimer, the term of this patent is extended or adjusted under 35 U.S.C. 154(b) by 288 days.

(21) Appl. No.: 13/739,692

(22) Filed: Jan. 11, 2013

(65) Prior Publication Data
US 2013/0204966 A1    Aug. 8, 2013

Related U.S. Application Data

(63) Continuation-in-part of application No. 13/007,094, filed on Jan. 14, 2011, now Pat. No. 8,762,484.

(60) Provisional application No. 61/585,604, filed on Jan. 11, 2012, provisional application No. 61/295,506, (Continued)

(51) Int. Cl.
G06Q 30/02      (2012.01)
G06F 15/16      (2006.01)
(Continued)

(52) U.S. Cl.
CPC .............. *H04L 67/24* (2013.01); *G06Q 10/06* (2013.01); *G06Q 10/063* (2013.01);
(Continued)

(58) Field of Classification Search
CPC .......... G06F 17/30864; G06F 17/3089; G06Q 30/02; G06Q 30/0256
USPC ................. 709/217; 707/709, 706, E17.014, 707/E17.044, E17.108; 705/14.54
See application file for complete search history.

(56) References Cited

U.S. PATENT DOCUMENTS 6,557,036 B1    4/2003    Kavacheri et al.
6,721,713 B1    4/2004    Guheen et al.
(Continued)

FOREIGN PATENT DOCUMENTS

WO    2009111799 A2    9/2009
WO    2011088349 A2    7/2011
(Continued)

OTHER PUBLICATIONS

Gustavo et al., "Web Services: Concepts, architectures and applications", Springer-Verlag, 2004, Chapter 5.2.4 and 5.3.3, 2004, pp. 141 and 144-147.
(Continued)

*Primary Examiner* — Joseph E Avellino
*Assistant Examiner* — Rachel J Hackenberg
(74) *Attorney, Agent, or Firm* — GTC Law Group LLP & Affiliates

(57) ABSTRACT

Methods and systems related to guided workflows for establishing a web presence include a customer user interface with a guided workflow layer based on a knowledge base about the customer, wherein the customer interface allows a customer to manage a customer's web presence based on operation of a logic engine that accesses information about what a customer has done and who the customer is (e.g. type of business), wherein the user interface presents a guided workflow of tasks associated with a recommended area of improvement for the customer.

14 Claims, 10 Drawing Sheets

Related U.S. Application Data filed on Jan. 15, 2010, provisional application No. 61/295,528, filed on Jan. 15, 2010, provisional application No. 61/303,281, filed on Feb. 10, 2010, provisional application No. 61/345,568, filed on May 17, 2010, provisional application No. 61/376,743, filed on Aug. 25, 2010.

(51) Int. Cl.
| | |
|---|---|
| *H04L 29/08* | (2006.01) |
| *G06Q 10/06* | (2012.01) |
| *G06Q 30/06* | (2012.01) |
| *G06F 17/30* | (2006.01) |

(52) U.S. Cl.
CPC ........... *G06Q 10/0633* (2013.01); *G06Q 30/02* (2013.01); *G06Q 30/0201* (2013.01); *G06Q 30/0243* (2013.01); *G06Q 30/0251* (2013.01); *G06Q 30/0601* (2013.01); *G06F 17/3089* (2013.01); *G06F 17/30864* (2013.01)

(56) References Cited

U.S. PATENT DOCUMENTS

| | | | |
|---|---|---|---|
| 6,792,458 | B1 | 9/2004 | Muret et al. |
| 6,868,444 | B1 | 3/2005 | Kim et al. |
| 6,901,377 | B1 | 5/2005 | Rosenfeld et al. |
| 6,947,982 | B1 | 9/2005 | McGann et al. |
| 7,155,462 | B1 | 12/2006 | Singh et al. |
| 7,340,686 | B2 | 3/2008 | Matthews et al. |
| 7,558,843 | B2 | 7/2009 | Lipscomb et al. |
| 7,574,471 | B2 | 8/2009 | Fotta et al. |
| 7,596,615 | B2 | 9/2009 | Satkunanathan et al. |
| 7,716,226 | B2 | 5/2010 | Barney |
| 7,752,313 | B2 | 7/2010 | Adelman et al. |
| 7,844,513 | B2 | 11/2010 | Smith |
| 7,849,202 | B2 | 12/2010 | Muret et al. |
| 7,900,005 | B2 | 3/2011 | Kotsovinos et al. |
| 7,945,652 | B2 | 5/2011 | Tsao et al. |
| 7,991,764 | B2 | 8/2011 | Rathod |
| 8,005,890 | B2 | 8/2011 | Rachitsky et al. |
| 8,065,327 | B2 | 11/2011 | Rosenfield et al. |
| 8,108,406 | B2 | 1/2012 | Kenedy et al. |
| 8,140,681 | B2 | 3/2012 | Adam et al. |
| 8,204,799 | B1 | 6/2012 | Murray et al. |
| 8,266,478 | B2 | 9/2012 | Fan et al. |
| 8,533,580 | B1 | 9/2013 | Xu |
| 8,560,471 | B2 | 10/2013 | Shama et al. |
| 8,595,338 | B2 | 11/2013 | Ravichandran et al. |
| 8,650,191 | B2* | 2/2014 | Connolly et al. ............. 707/736 |
| 8,762,463 | B2 | 6/2014 | Ravichandran et al. |
| 8,762,484 | B2 | 6/2014 | Ravichandran et al. |
| 8,805,973 | B2 | 8/2014 | Schwimer |
| 8,819,121 | B2 | 8/2014 | Ravichandran et al. |
| 8,819,122 | B2 | 8/2014 | Ravichandran et al. |
| 8,819,207 | B2 | 8/2014 | Ravichandran et al. |
| 8,825,746 | B2 | 9/2014 | Ravichandran et al. |
| 8,843,571 | B2 | 9/2014 | Ravichandran et al. |
| 8,935,314 | B2 | 1/2015 | Ravichandran et al. |
| 2002/0042733 | A1 | 4/2002 | Lesandrini et al. |
| 2002/0052782 | A1 | 5/2002 | Landesmann |
| 2002/0055974 | A1 | 5/2002 | Hawkes et al. |
| 2002/0069079 | A1 | 6/2002 | Vega |
| 2002/0073208 | A1 | 6/2002 | Wilcock et al. |
| 2002/0073210 | A1 | 6/2002 | Low et al. |
| 2002/0120554 | A1 | 8/2002 | Vega |
| 2002/0143945 | A1 | 10/2002 | Shahabuddin et al. |
| 2002/0147570 | A1 | 10/2002 | Kraft et al. |
| 2002/0198933 | A1 | 12/2002 | Kwak |
| 2003/0061404 | A1 | 3/2003 | Atwal et al. |
| 2003/0069974 | A1 | 4/2003 | Lu et al. |
| 2003/0105884 | A1 | 6/2003 | Upton |
| 2003/0110242 | A1 | 6/2003 | Brown et al. |
| 2003/0172145 | A1 | 9/2003 | Nguyen |
| 2003/0177027 | A1 | 9/2003 | DiMarco |
| 2003/0204843 | A1 | 10/2003 | Barmettler et al. |
| 2003/0220880 | A1* | 11/2003 | Lao et al. ............. 705/51 |
| 2003/0224781 | A1 | 12/2003 | Milford et al. |
| 2004/0030740 | A1 | 2/2004 | Stelting |
| 2004/0098302 | A1 | 5/2004 | Feeley |
| 2004/0103339 | A1 | 5/2004 | Chalasani et al. |
| 2004/0107125 | A1 | 6/2004 | Guheen et al. |
| 2004/0220952 | A1 | 11/2004 | Cheenath |
| 2005/0076132 | A1 | 4/2005 | Roberts et al. |
| 2005/0086197 | A1 | 4/2005 | Boubez et al. |
| 2005/0193093 | A1 | 9/2005 | Mathew et al. |
| 2005/0228984 | A1 | 10/2005 | Edery et al. |
| 2005/0246441 | A1 | 11/2005 | Chandrasekaran et al. |
| 2005/0283395 | A1 | 12/2005 | Lesandrini et al. |
| 2006/0020525 | A1 | 1/2006 | Borelli et al. |
| 2006/0085408 | A1* | 4/2006 | Morsa ............. G06Q 30/02 |
| 2006/0107314 | A1 | 5/2006 | Cataldi |
| 2006/0129654 | A1 | 6/2006 | Sato |
| 2006/0165040 | A1 | 7/2006 | Rathod et al. |
| 2006/0235986 | A1 | 10/2006 | Kim |
| 2006/0253365 | A1 | 11/2006 | Langshur et al. |
| 2006/0253596 | A1 | 11/2006 | Barone et al. |
| 2006/0288115 | A1 | 12/2006 | Neuman |
| 2007/0011209 | A1 | 1/2007 | Wietlisbach et al. |
| 2007/0038516 | A1 | 2/2007 | Apple et al. |
| 2007/0061465 | A1 | 3/2007 | Kim et al. |
| 2007/0067396 | A1 | 3/2007 | Blinn et al. |
| 2007/0100739 | A1 | 5/2007 | Cui et al. |
| 2007/0150480 | A1 | 6/2007 | Hwang et al. |
| 2007/0153691 | A1 | 7/2007 | Halpern |
| 2007/0283348 | A1 | 12/2007 | White |
| 2008/0065677 | A1 | 3/2008 | Howard et al. |
| 2008/0082569 | A1 | 4/2008 | Mansour et al. |
| 2008/0147812 | A1 | 6/2008 | Curtis |
| 2008/0147856 | A1 | 6/2008 | Lee et al. |
| 2008/0222375 | A1 | 9/2008 | Kotsovinos et al. |
| 2008/0243634 | A1 | 10/2008 | Dworkin et al. |
| 2008/0270515 | A1 | 10/2008 | Chen et al. |
| 2008/0281915 | A1 | 11/2008 | Elad et al. |
| 2009/0037875 | A1 | 2/2009 | Jones et al. |
| 2009/0083272 | A1 | 3/2009 | Li et al. |
| 2009/0132698 | A1 | 5/2009 | Barnhill |
| 2009/0150995 | A1 | 6/2009 | Hogan et al. |
| 2009/0182605 | A1 | 7/2009 | Lappas et al. |
| 2009/0192879 | A1 | 7/2009 | Hood et al. |
| 2009/0234887 | A1 | 9/2009 | Rosenfield et al. |
| 2009/0276771 | A1 | 11/2009 | Nickolov et al. |
| 2009/0292545 | A1 | 11/2009 | Mohammed et al. |
| 2009/0323593 | A1 | 12/2009 | Barone et al. |
| 2010/0076863 | A1 | 3/2010 | Golomb |
| 2010/0095067 | A1 | 4/2010 | Kosaraju et al. |
| 2010/0106764 | A1 | 4/2010 | Chadwick et al. |
| 2010/0114654 | A1 | 5/2010 | Lukose et al. |
| 2010/0115490 | A1 | 5/2010 | Wilcock et al. |
| 2010/0125826 | A1 | 5/2010 | Rice et al. |
| 2010/0146119 | A1 | 6/2010 | Lee |
| 2010/0153569 | A1 | 6/2010 | Schreiber |
| 2010/0205302 | A1 | 8/2010 | Rechterman |
| 2010/0306381 | A1 | 12/2010 | Lublin et al. |
| 2010/0318507 | A1* | 12/2010 | Grant et al. ............. 707/706 |
| 2010/0325191 | A1 | 12/2010 | Jung et al. |
| 2011/0010612 | A1 | 1/2011 | Thorpe et al. |
| 2011/0055859 | A1 | 3/2011 | Dasher et al. |
| 2011/0072073 | A1 | 3/2011 | Curtis |
| 2011/0072312 | A1 | 3/2011 | Fan et al. |
| 2011/0107294 | A1 | 5/2011 | Ionfrida et al. |
| 2011/0161411 | A1 | 6/2011 | Rechterman |
| 2011/0178831 | A1 | 7/2011 | Ravichandran |
| 2011/0178838 | A1 | 7/2011 | Ravichandran |
| 2011/0178840 | A1 | 7/2011 | Ravichandran |
| 2011/0178865 | A1 | 7/2011 | Ravichandran |
| 2011/0178869 | A1 | 7/2011 | Ravichandran et al. |
| 2011/0178870 | A1 | 7/2011 | Ravichandran et al. |
| 2011/0178890 | A1 | 7/2011 | Ravichandran et al. |
| 2011/0179101 | A1 | 7/2011 | Ravichandran et al. |
| 2011/0179102 | A1 | 7/2011 | Ravichandran et al. |

(56) References Cited

U.S. PATENT DOCUMENTS

| | | |
|---|---|---|
| 2011/0179103 A1 | 7/2011 | Ravichandran et al. |
| 2011/0179111 A1 | 7/2011 | Ravichandran et al. |
| 2011/0179112 A1 | 7/2011 | Ravichandran et al. |
| 2011/0179135 A1 | 7/2011 | Ravichandran et al. |
| 2011/0179137 A1 | 7/2011 | Ravichandran et al. |
| 2011/0179141 A1 | 7/2011 | Ravichandran et al. |
| 2011/0179142 A1 | 7/2011 | Ravichandran et al. |
| 2011/0179145 A1 | 7/2011 | Ravichandran et al. |
| 2011/0179147 A1 | 7/2011 | Ravichandran et al. |
| 2011/0179150 A1 | 7/2011 | Ravichandran et al. |
| 2011/0179154 A1 | 7/2011 | Ravichandran et al. |
| 2011/0179155 A1 | 7/2011 | Ravichandran et al. |
| 2011/0179156 A1 | 7/2011 | Ravichandran et al. |
| 2011/0179165 A1 | 7/2011 | Ravichandran |
| 2011/0179175 A1 | 7/2011 | Ravichandran et al. |
| 2011/0179176 A1 | 7/2011 | Ravichandran et al. |
| 2011/0191163 A1 | 8/2011 | Allaire et al. |
| 2012/0004925 A1 | 1/2012 | Braverman et al. |
| 2012/0005148 A1 | 1/2012 | Horvitz et al. |
| 2012/0124204 A1 | 5/2012 | Robb et al. |
| 2012/0179566 A1 | 7/2012 | Soroca et al. |
| 2012/0198076 A1 | 8/2012 | Kancharla et al. |
| 2013/0204746 A1 | 8/2013 | Lee et al. |
| 2013/0254035 A1 | 9/2013 | Ramer et al. |
| 2014/0164486 A1 | 6/2014 | Ravichandran et al. |
| 2014/0215033 A1 | 7/2014 | Ravichandran et al. |

FOREIGN PATENT DOCUMENTS

| | | |
|---|---|---|
| WO | 2011088349 A3 | 10/2011 |
| WO | 2013106708 A1 | 7/2013 |

OTHER PUBLICATIONS

Harding, Anne, "A-Server NV: Datacenter-as-a-Service (DAAS. com) Delivers Next Generation Cloud Computing for Service Providers", available at: <http://www.tmcnet.com/usubmit/2009/03/17/4062651.html>, Mar. 17, 2009, 2 pages.

International Application Serial No. PCT/US11/21340, International Search Report and Written Opinion mailed on Aug. 31, 2011, 8 pages.

International Application Serial No. PCT/US11/21340, International Preliminary Report on Patentability mailed on Jul. 26, 2012, 5 pages.

Underwood et al., "Web Hosting: An Overview, Gartner Technical Report", online: http://marcusball.com/marcusball/opinion/CS3%20opinion/90803.pdf, 2001, pp. 2-4.

11733458.1, European Application Serial No. 11733458.1, Communication pursuant to Article 94(3) EPC mailed Jul. 4, 2014, Endurance International Group, Inc., 6 Pages.

11733458.1, European Application Serial No. 11733458.1, Extended European Search Report mailed Aug. 9, 2013, Endurance International Group, Inc., 7 pages.

Alonso, et al., "Webservices: Concepts, architecture and apllications", <URL: http://www.inf.ethz.ch/personal/alonso/Web-book/Chapter-5.pdf>, 2004, pp. 123-149.

PCT/US2013/021231, International Application Serial No. PCT/US2013/021231, International Preliminary Report on Patentability With Written Opinion mailed Jul. 24, 2014, Endurance International Group, Inc., 10 Pages.

PCTUS2013021231, International Application Serial No. PCTUS2013021231, International Search Report and Written Opinion mailed May 31, 2013, 13.

Svetnik, et al., "Random Forest: A Classification and Regression Tool for Compound Classification and QSAR Modeling", J. Chem. Inf. Comput. Sci. 2003,43, 1947-1958, Nov. 4, 2003, 12 Pages.

\* cited by examiner

GUIDED WORKFLOWS FOR ESTABLISHING A WEB PRESENCE

CROSS-REFERENCE TO RELATED APPLICATIONS

This application claims the benefit of U.S. provisional patent application Ser. No. 61/585,604 filed Jan. 11, 2012, which is hereby incorporated by reference in its entirety.

This application is a continuation in part of U.S. patent application Ser. No. 13/007,094 filed Jan. 14, 2011 that claims the benefit of the following provisional applications, each of which is hereby incorporated by reference in its entirety: U.S. Ser. No. 61/295,506 filed Jan. 15, 2010; U.S. Ser. No. 61/295,528 filed Jan. 15, 2010; U.S. Ser. No. 61/303,281 filed Feb. 10, 2010; U.S. Ser. No. 61/345,568 filed May 17, 2010; and U.S. Ser. No. 61/376,743 filed Aug. 25, 2010.

BACKGROUND

1. Field of the Invention

The present invention relates to providing web presence services via guided workflows.

2. Description of the Related Art

Delivery of web site and web hosting services is fragmented and generally requires a user to separately identify and take several distinct steps, mostly by trial and error, to establish a new web presence, generally resulting in at least some portion of the web presence being incomplete. In addition, techniques for improving a web presence are generally limited to measuring and improving visibility with Internet search engines.

SUMMARY OF THE INVENTION

Described herein are methods and systems embodied as a suite of tools designed to engage web hosting customers by helping them in various ways including: quickly understanding what the customer needs to do to establish a basic web presence; prioritizing tasks and the ordering of tasks for a successful web presence; evaluating and selecting among available tools, features, and the like; performing web presence tasks quickly with minimal time, knowledge and effort; progressing confidently toward major web presence milestones; getting more value and utility out of a client web hosting arrangement, and the like.

Methods and systems related to guided workflows for establishing a web presence include a customer user interface with a guided workflow layer based on a knowledge base about the customer, wherein the customer interface allows a customer to manage a customer's web presence based on operation of a logic engine that accesses information about what a customer has done and who the customer is (e.g. type of business), wherein the user interface presents a guided workflow of tasks associated with a recommended area of improvement for the customer.

In the methods and systems, the web presence includes at least one of electronic communication (e.g. email), website, domain, and website-related tasks. In the methods and systems, accessing information includes at least one of accessing information provided by the customer through the user interface and accessing information stored in a database. In the methods and systems, the database is a database of the host of the logic engine or an external database.

In the methods and systems, the guided workflow includes a decision tree that allows a customer to choose one or more paths. A path is at least one of a most traveled path by customers of this type, a most successful path traveled by customers of this type, an easiest next path, a path that results in a web presence that is desired by the customer, a path that fits a desire-based prioritization scheme, and the like.

In the methods and systems, the guided workflow is based on conditional logic that permits a plurality of different paths. In the methods and systems, the guided workflow is based at least in part on the status of a ticketing process associated with a customer.

In the methods and systems, the host is at least one of a customer, a reseller, an affiliate, a customer of a customer, a domain registrar, a web services provider, a cloud services provider, a network services provider, an online services provider, and an internet service provider, and the like. In the methods and systems, the guided workflow is associated with the market of the customer.

Methods and systems related to guided workflows for establishing a web presence include a central command center for allowing a host to present options to a customer to allow the customer to manage the customer's web presence, wherein the command center is associated with (a) a logic engine that accesses information about what a customer has done and who the customer is (type of business) and provides a recommended workflow of tasks associated with an area of improvement for the customer; (b) one or more platforms for enabling elements of web presence; (c) an abstraction layer that allows the host to manage web presence enabling elements in a unified user interface independent of the native language of a platform; and (d) a host api module that takes input from the abstraction layer and initiates actions on the platforms to enable the web presence. In the methods and systems of claim a platform may be a platform of the host or a platform of a third party. In the methods and systems, a platform may be a social media platform or some other type of web-enabled platform.

Methods and systems related to guided workflows for establishing a web presence include a central command center for allowing a host to present options to a customer to allow the customer to manage the customer's web presence, wherein the command center is associated with a logic engine that accesses information about what a customer has done and who the customer is (e.g. type of business) and provides a recommended workflow of tasks associated with an area of improvement for the customer.

Methods and systems related to guided workflows for establishing a web presence include a central command center for allowing a host to present options to a customer to allow the customer to manage the customer's web presence, wherein the command center is associated with (a) one or more platforms for enabling elements of web presence and (b) a host api module that takes input from the host system and initiates actions on the platforms to enable the web presence.

Methods and systems related to guided workflows for establishing a web presence include a central command center for allowing a host to present options to a customer to allow the customer to manage the customer's web presence, wherein the command center is associated with (a) one or more platforms for enabling elements of web presence and (b) an abstraction layer that allows the host to manage web presence enabling elements in a unified user interface independent of the native language of a platform.

Methods and systems related to guided workflows for establishing a web presence include a central command center for allowing a host to present options to a customer to allow the customer to manage the customer's web presence, wherein the command center is associated with (a) a logic engine that accesses information about what a customer has done and who the customer is (e.g. type of business) and provides a recommended workflow of tasks associated with an area of improvement for the customer; (b) one or more platforms for enabling elements of web presence; (c) an abstraction layer that allows the host to manage web presence enabling elements in a unified user interface independent of the native language of a platform, the user interface of the abstraction layer permitting a host to enter business rules for establishing workflows associated with the customer's web presence; and (d) a host api module that takes input from the abstraction layer and initiates actions on the platforms to enable the web presence. In the methods and systems, the information accessed by the logic engine further comprises market data, other customer data, systems information, customer's competitor data, a search results.

Methods and systems related to guided workflows for establishing a web presence include an instant profile wizard for creation of online presence of a customer based on basic profile information, the wizard embodying a workflow generated and governed by a logic engine, wherein the logic engine accesses information about what a business has, the type of the business, and what the business wishes to have in a basic website, and the wizard allows the customer to rapidly create a customized web presence using the basic profile information. In the methods and systems, the information accessed by the logic engine further comprises market data, other customer data, systems information, customer's competitor data, a search results. In the methods and systems, the wizard is presented to the purchaser following the purchase of at least one of a web domain and a hosting services package.

Methods and systems related to guided workflows for establishing a web presence include storing a data structure for instant creation of a web presence, including information about status of what web-presence related items a business has completed, information about the type of business, and information about what the business desires for its web presence Methods and systems related to guided workflows for establishing a web presence include collecting information about status of what web-presence related items a customer has completed and information about the type of customer; comparing the completed items to a set of items completed by similar customers; and recommending a next action for the customer to modify its web presence. In the methods and systems, the similar customers were guided to complete the items. Alternatively, the similar customers completed the items without guidance. In the methods and systems, the recommended next action is derived from a candidate list of recommended next actions based on a customer web presence desire.

Methods and systems related to guided workflows for establishing a web presence include an algorithm for selection of a recommended next action for improving the web presence of a customer based on at least one of the type of customer, the status of completion of a set of standard actions for establishing a web presence, and outcomes achieved by similar types of customers that took steps not yet completed by the customer.

Methods and systems related to guided workflows for establishing a web presence include an algorithm for selection of a recommended path for improving the web presence of a customer based on at least one of the type of customer, the status of completion of a set of standard actions for establishing a web presence, and outcomes achieved by similar types of customers that took steps not yet completed by the customer. In the methods and systems, a recommended path may include conditional logic that is dependent on client-related data, web hosting data, third-party data and the like. In the methods and systems, a recommended path may be based on customer decisions. Alternatively a recommended path may include requiring a customer to make decisions, such as to configure an element of web presence. Yet alternatively, following a recommended path may include accessing or using a decision tree. In the methods and systems, the recommended path is derived from a candidate list of recommended paths based on a customer web presence desire.

Methods and systems related to guided workflows for establishing a web presence include providing at least one portable workflow for guiding a customer through a path of tasks associated with establishing an element of a web presence, wherein upon a customer's performing tasks within the workflow the element of the web presence is automatically established.

Methods and systems related to guided workflows for establishing a web presence include providing a workflow for establishing a customer's web presence; porting the workflow and the logic engine link to a customer's customer, and enabling the customer's customer to use and extend the workflow to establish a web presence.

Methods and systems related to guided workflows for establishing a web presence include providing at least one portable user interface, the user interface allowing a first customer to create workflows for guiding a second customer (e.g. a third party) through a path of tasks associated with establishing an element of a web presence, wherein upon the second customer's performing tasks within the workflow, the element of the web presence is automatically established.

Methods and systems related to guided workflows for establishing a web presence include a central command center for allowing a host to present options to a customer to allow the customer to manage the customer's web presence, wherein the command center is associated with a logic engine that accesses information about what a customer has done and who the customer is (e.g. type of business) and provides a recommended workflow of tasks associated with an area of improvement for the customer, wherein the workflow is portable from a first customer to a second customer and wherein upon the second customer's performing tasks within the workflow, the element of the web presence is automatically established.

Methods and systems related to guided workflows for establishing a web presence include a central command center for allowing a host to present options to a customer to allow the customer to manage the customer's web presence, wherein the command center is associated with (a) one or more platforms for enabling elements of web presence and (b) a host api module that takes input from the host system and initiates actions on the platforms to enable the web presence and wherein the host API initiates actions specified for a workflow that is portable from a first customer to a second customer such that upon the second customer's performing tasks within the workflow, the element of the web presence is automatically established based on initiation of actions through the host API.

Methods and systems related to guided workflows for establishing a web presence include a central command center for allowing a host to present options to a customer to allow the customer to manage the customer's web presence, wherein the command center is associated with (a) one or more platforms for enabling elements of web presence and (b) an abstraction layer that allows the host to manage web presence enabling elements in a unified user interface independent of the native language of a platform, wherein the web presence enabling elements are presented in workflow that is portable from a first customer to a second customer who has access to the abstraction layer.

Methods and systems related to guided workflows for establishing a web presence include a central command center for allowing a host to present options to a customer to allow the customer to manage the customer's web presence, wherein the command center is associated with (a) a logic engine that accesses information about what a customer has done and who the customer is (e.g. type of business) and provides a recommended workflow of tasks associated with an area of improvement for the customer; (b) one or more platforms for enabling elements of web presence; (c) an abstraction layer that allows the host to manage web presence enabling elements in a unified user interface independent of the native language of a platform, the user interface of the abstraction layer permitting a host to enter business rules for establishing workflows associated with the customer's web presence; and (d) a host api module that takes input from the abstraction layer and initiates actions on the platforms to enable the web presence, wherein at least one workflow is portable from a first customer to a second customer and wherein upon the second customer's performing tasks within the workflow, the element of the web presence is automatically established.

The systems and methods of establishing a web presence disclosed herein include allowing a host to enhance a web presence of a customer. The system may include several steps, such as: a) a customer database being a knowledge base that at least includes customer type and customer history information; b) a logic engine adapted to: access customer type and customer history information from the customer database, receive information regarding a current web presence of the customer, and select a guided workflow layer based upon the information accessed and received; and c) a user interface adapted to: run the guided workflow layer, provide output based upon the guided workflow layer, receive customer input in response to the output provided, and apply customer input to the guided work flow layer to result in execution of at least one recommended task to result in an enhanced web presence. In this system, the step to select a guided workflow includes referencing a measure of at least one of the group consisting of: electronic communication, email, website, domain, and website-related tasks. In this system, the information accessed from the customer database includes at least one of the group consisting of: (a) information received through the user interface; and (b) information pre-stored in the customer database. In this system, the customer database is coupled to the logic engine. In this system, the customer database is an external database. In this system, the guided workflow layer employs a decision tree that directs a customer to choose one or more paths. In this system, the path to which the customer is directed is at least one of: (a) a most frequently used path for a given customer type; (b) a path that has had the best results in enhancing web presence for a given customer type; and (c) a path that fits a predefined prioritization scheme. In this system, the guided workflow layer is based upon conditional logic that permits a choice of a plurality of different paths. In this system, the guided workflow layer is based, at least in part, on a status of a ticketing process associated with the customer. In this system, said host is at least one of a customer, a reseller, an affiliate, a customer of a customer, a domain registrar, a web services provider, a cloud services provider, a network services provider, an online services provider, and an internet service provider. In this system, the guided workflow layer facilitates the user interface providing questions related to a market associated with the customer type. This system may further include: (a) a central command center that allows a host to present options to a customer to allow the customer to manage the customer's web presence, (b) at least one web presence enabling platform that enables web presence elements, and (c) an API module that takes input from the host and initiates actions on the web presence enabling platforms to enable the web presence.

The systems and methods of establishing a web presence disclosed herein include a system adapted to improve a web presence of a customer. The system may include several steps, such as: a) a central command center adapted to: run a guided work flow, and present options from the guided work flow to said customer and receive customer input from a user interface controlled at least in part by the central command center; b) at least one web presence enabling platform adapted to enable elements of web presence; (c) at least one API module adapted to receive input from the central command center and initiate actions on the web presence enabling platforms to perform tasks enabling enhanced web presence; and (d) an abstraction layer that provides a unified user interface independent of the native language of a platform that facilitates communications between the API and the web presence enabling platforms. In this system, the central command center may further include: a user interface adapted to present various options from the guided work flow to a customer and receive customer input provided to the guided work flow to facilitate managing the customer's web presence. In this system, at least one of the web presence enabling platforms is connected to the host API module. In this system, at least one of the web presence enabling platforms is connected to a platform of a third party. In this system, at least one of the web presence enabling platforms is a social media platform. In this system, at least one of the web presence enabling platforms is a web-enabled platform. In this system, the command center is associated with a logic engine that accesses information about customer history and customer type and provides a recommended workflow of tasks associated with an area of improvement for the customer. This system related to improving a web presence of a customer wherein the central command center is adapted to allow a host to present options to a customer to allow the customer to manage the customer's web presence may further include: (a) at least one web presence enabling platform for enabling web presence elements; and (b) an abstraction layer that allows the host to manage web presence enabling platforms in a unified user interface independent of the native language of each platform.

The systems and methods of establishing a web presence disclosed herein include a system related to guided workflows for establishing a web presence. The system may include several steps, such as: (a) a central command center for allowing a host to present options to a customer to allow the customer to manage the customer's web presence, (b) a logic engine coupled to the central command center adapted to: access information regarding customer history and customer type, and provide a recommended guided workflow of tasks associated with an area of improvement for the customer; (c) one or more web presence enabling platforms coupled to the central command center for enabling elements of web presence; (d) an abstraction layer that allows the host to manage web presence enabling elements in a unified user interface independent of the native language of a web presence enabling platform, the abstraction layer further comprising: a user interface of the abstraction layer permitting a host to enter business rules for establishing the guided workflows associated with the customer's web presence; and (e) a host API module that receives input from the abstraction layer and initiates actions on the web presence platforms to enable the web presence. In this system, the information accessed by the logic engine may further include at least one of market data, other customer data, systems information, customer's competitor data, and search results.

The systems and methods of establishing a web presence disclosed herein include a system related to guided workflows for establishing a web presence. The system may include several steps, such as: (a) a logic engine adapted to access information about what a business has, the type of the business, and what the business wishes to have in a basic website, and generates a business-specific web presence enablement workflow; and b) a profile-based wizard adapted to: receive basic customer profile information, receive the workflow generated by the logic engine, and execute the business-specific web presence enablement workflow to create a current online web presence of a customer based upon the basic customer profile information to rapidly create a customized web presence. In this system, the information accessed by the logic engine may further include at least one of: market data, other customer data, systems information of the business, competitor data of the business, and search results related to the business. In this system, the profile-based wizard is presented following a purchase of at least one of a web domain and a hosting services package.

The systems and methods of establishing a web presence disclosed herein include preparing for instant creation of a web presence. The method may include several steps, such as: (a) electronically collecting information with a web server about status of what web-presence related items a business has completed, information about the type of business, and information about what the business desires for its web presence; and (b) storing the information in a memory accessible by the web server for subsequent use in creation of a web presence.

The systems and methods of establishing a web presence disclosed herein include guided workflows for establishing a web presence. The method may include several steps, such as: (a) electronically collecting with a server information about status of what web-presence related items a customer has completed and information about the type of customer; (b) comparing with the server the completed items to a set of items completed by similar customers; and (c) automatically recommending a next action for the customer to modify its web presence with the server. This method may further include: guiding the similar customers to complete the items a customer has completed. This method may further include: (a) receiving electronic information that represents customer web presence desires; (b) creating a candidate list of recommended next actions based upon the customer web presence desires; and (c) automatically deriving a recommended next action from the candidate list of recommended next actions.

The systems and methods of establishing a web presence disclosed herein include a computer implemented method for selecting a recommended next action for improving a web presence of a customer. The method may include several steps, such as: (a) receiving electronic customer type information for the customer; (b) determining with a server the status of customer completion of a set of standard actions for establishing a web presence; (c) determining outcomes achieved by similar types of customers that completed standard actions not yet completed by the customer; and (d) recommending with the server a next action for improving the web presence of the customer based upon at least one of the received customer type information, the determined status of completion of the standard actions, and the determined outcomes.

The systems and methods of establishing a web presence disclosed herein include a computer implemented method for selecting a recommended path for improving a web presence of a customer. The method may include several steps, such as: (a) receiving electronic customer type information for the customer; (b) determining with a server the status of customer completion of a set of standard actions for establishing a web presence; (c) determining outcomes achieved by similar types of customers that completed standard actions not yet completed by the customer; and (d) recommending with the server a path for improving the web presence of the customer based upon at least one of the received customer type information, the determined status of completion of the standard actions, and the determined outcomes. In this system, the recommended path may include conditional logic that is dependent on at least one of client-related data, web hosting data, and third-party data. In this system, the recommended path may be based on decisions of the customer. In this system, the recommended path may include requiring the customer to make decisions, such as to configure a web presence element. In this system, following the recommended path may include accessing or using a decision tree. In this system, the recommended path is derived from a candidate list of recommended paths based on a customer web presence desire.

The systems and methods of establishing a web presence disclosed herein include establishing a web presence element. The method may include several steps, such as: (a) obtaining at least one portable workflow for guiding a customer through a path of tasks associated with establishing an element of a web presence; and (b) providing the portable workflow to a computer operated by the customer as a computer executable program causing the computer to perform tasks within the workflow causing the web presence element to be automatically established.

The systems and methods of establishing a web presence disclosed herein include establishing a web presence. The method may include several steps, such as: (a) providing a workflow running in a logic engine for establishing a customer's web presence; (b) porting the workflow and a link to the logic engine to a customer's customer, and (c) enabling the customer's customer to use the workflow to establish a web presence.

The systems and methods of establishing a web presence disclosed herein include establishing a web presence. The method may include several steps, such as: (a) creating at least one portable computer-based user interface allowing a first customer to create an electronic web presence enabling workflow for guiding a second customer through a path of tasks associated with establishing a web presence element; and (b) providing the portable computer-based user interface to the second customer allowing the second customer to perform tasks within the workflow, thereby causing a web presence element to be automatically established.

The systems and methods of establishing a web presence disclosed herein include guided workflows for establishing a web presence. The method may include several steps, such as: (a) a logic engine adapted to: receive measures of web presence areas, determine web presence areas in need of improvement, access customer information, provide a recommended workflow of tasks associated with an area of improvement for the customer, and run the workflow; wherein the workflow is portable from a first customer to a second customer and wherein upon the second customer's performing tasks within the workflow, an element of the web presence is automatically established; and (b) a central command center coupled to the logic engine adapted to: allow a host to present options to a customer to allow the customer to interact with the workflow and manage the customer's web presence. This system may further include: (a) one or more web presence enabling platforms for enabling web presence elements; (b) an abstraction layer that allows the host to manage web presence elements in a unified user interface independent of the native language of a platform, that may further include: a user interface of the abstraction layer permitting a host to enter business rules for establishing workflows associated with the customer's web presence; and (c) a host API module adapted to: receive input from the abstraction layer and initiate actions on the web presence enabling platforms to enable the web presence, wherein at least one workflow is portable from a first customer to a second customer and wherein upon the second customer's performing tasks within the workflow, the web presence element is automatically established.

The systems and methods of establishing a web presence disclosed herein include guided workflows for establishing a web presence. The system may include several steps, such as: (a) a central command center adapted to: allow a host to present options to a customer to allow the customer to manage the customer's web presence; (b) one or more web presence enabling platforms for enabling web presence elements; and (c) a host API module adapted to: receive input from the central command center, and initiate actions on the web presence platforms to enable the web presence; wherein the host API module initiates actions specified for a workflow that is portable from a first customer to a second customer such that upon the second customer's performing tasks within the workflow, a web presence element is automatically established based on initiation of actions through the API module.

The systems and methods of establishing a web presence disclosed herein include establishing a web presence. The system may include several steps, such as: (a) a central command center for allowing a host to present options to a customer to allow the customer to manage the customer's web presence; (b) one or more platforms associated with the central command center for enabling web presence elements; and (c) an abstraction layer that allows the host to manage web presence enabling elements in a unified user interface independent of the native language of a platform; wherein the web presence enabling elements are presented in workflow that is portable from a first customer to a second customer who has access to the abstraction layer.

The systems and methods of establishing a web presence disclosed herein include enhancing web presence of a customer. The method may include several steps, such as: (a) gathering measures of user web presence areas; (b) determining a candidate area from the user web presence areas most in need of improvement; (c) selecting a guided work flow relating to the candidate area; (d) presenting the guided work flow to the customer; (e) receiving and acting on user input to create a script for a web presence element; and (f) executing the script to create a web presence element to improve the web presence of a customer. In this method, the step of determining a candidate area may further include: (a) comparing the gathered measures of the web presence areas to those of peers to determine at least one candidate area for improvement having a magnitude significantly lower than that of the peers; and (b) comparing the candidate areas for improvement to industry metrics to determine the candidate area most in need of improvement.

The systems and methods of establishing a web presence disclosed herein include allowing a host to present various options to a customer to facilitate enhancing a customer's web presence. The system may include several steps, such as: (a) a logic engine adapted to: receive information regarding the customer from a customer database; receive information regarding a plurality of web presence areas for the customer; select at least one web presence area needing improvement as a candidate area; and select workflow tasks relating to the selected candidate area; (b) a plurality of website presence enabling platforms each adapted to facilitate providing certain web presence elements when provided with proper instructions; (c) a central command center coupled to the logic engine and the web presence enabling platforms, adapted to: receive the selected candidate area and the selected workflow tasks relating to the selected candidate area from the logic engine; create a guided work flow to improve the web presence of the selected candidate area; execute the guided work flow to provide options to the customer and receive customer input; create at least one executable script based upon the customer input to the guided workflow; and providing the executable script to at least one of the website presence enabling platforms as instructions causing them to provide certain web presence elements, thereby enhancing a customer's web presence. In this system, the logic engine selects the candidate area by using at least one of: a threshold associated with an area, a model of continuous or progressive improvement of a web presence, comparative ranking, area popularity, a measure of changes already made to the area. In this system, the central command center may further include: a user interface adapted to interactively display the options to the customer and receive customer-supplied input. This system may further include: an application programming interface ("API") coupled between the logic engine and at least one of the: web presence areas, customer database, web presence object definitions templates, the workflow task library, an abstraction layer adapted to facilitate communication between the coupled elements of the system. This system may further include: an abstraction layer coupled between the web presence enabling platforms and the API adapted to provide a unified user interface independent of the native language of the web presence enabling platforms and the API.

The systems and methods of establishing a web presence disclosed herein include recommending an enhancement of a web presence of a customer. The system may include several steps, such as: (a) a customer database being a knowledge base that at least includes customer type and customer history information; (b) a logic engine adapted to: access customer type and customer history information from the customer database, receive information regarding a current web presence of the customer, and select a guided workflow layer based upon the information accessed and received; and (c) a user interface adapted to: run the guided workflow layer, provide output based upon the guided workflow layer, receive customer input in response to the output provided, apply customer input to the guided work flow layer to result in a recommended workflow comprising at least one task to result in an enhanced web presence, and present the recommended workflow to the customer in the user interface. In this system, the step to select a guided workflow layer may include selecting at least two workflow tasks from a workflow task library. In this system, the step to select a guide workflow layer may include processing the accessed and received data with web presence object definitions to determine at least one web presence object for presenting to the user with the guided workflow layer. In this system, the at least one web presence object is adapted by the logic engine prior to presenting to the user.

BRIEF DESCRIPTION OF THE FIGURES

In the figures, which are not necessarily drawn to scale, like numerals may describe substantially similar components throughout the several views. Like numerals having different letter suffixes may represent different instances of substantially similar components. The figures illustrate generally, by way of example, but not by way of limitation, certain embodiments discussed in the present document.

DETAILED DESCRIPTION OF THE PREFERRED EMBODIMENT(S)

Detailed aspects of the inventive methods and systems of an engagement platform are disclosed herein; however, it is to be understood that the disclosed embodiments are merely exemplary of the methods and systems, which may be embodied in various forms. Therefore, specific structural and functional details disclosed herein are not to be interpreted as limiting, but merely as a representative basis for teaching one skilled in the art to variously employ the present methods and systems in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and/or mechanically.

Figure 1:
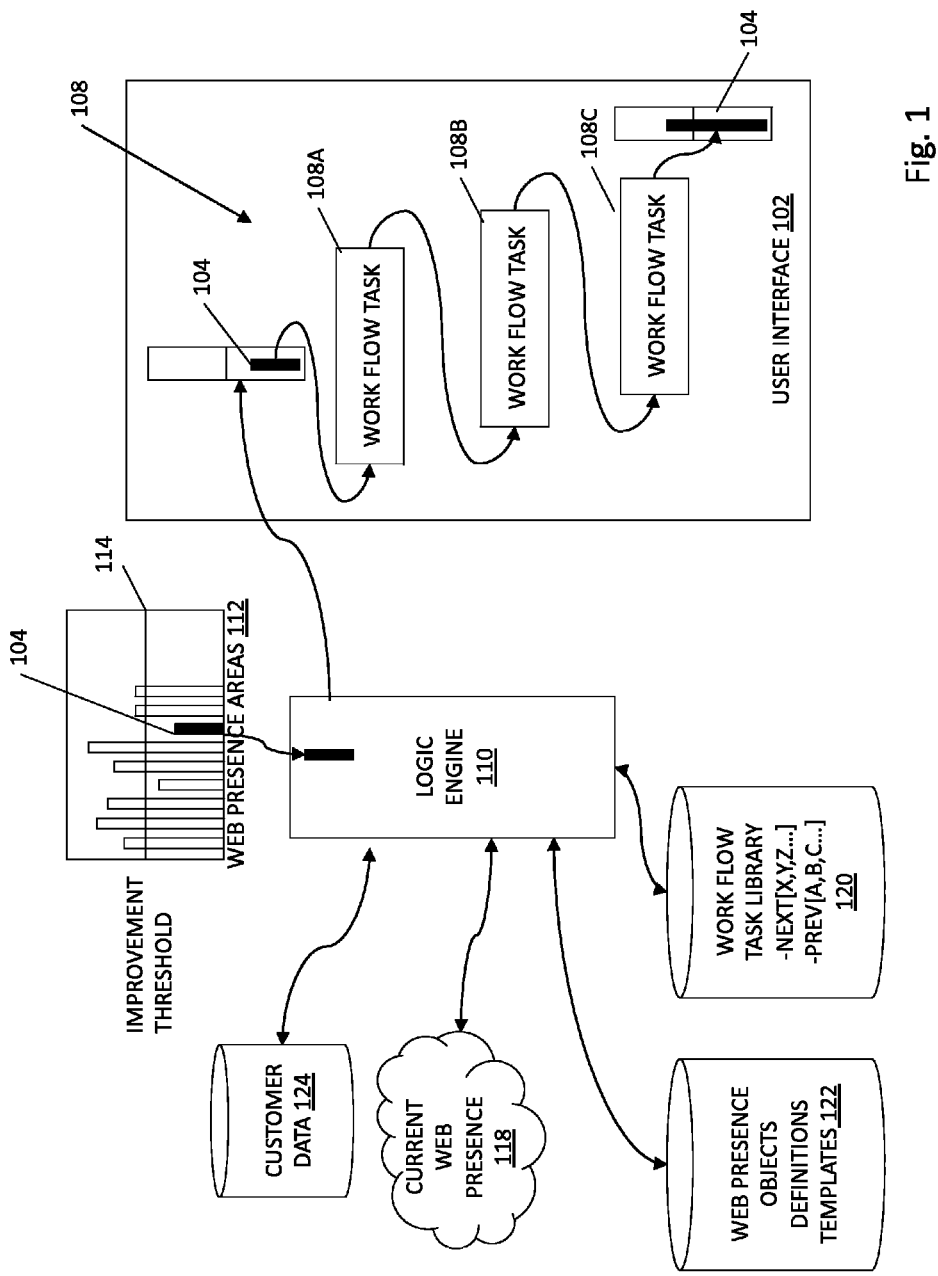
FIG. 1 depicts an example of a user interface for establishing a web presence via a guided workflow.

FIG. 1 depicts an example of a user interface 102 for managing a customer's web presence, such as for establishing a web presence via a guided workflow in accordance with various embodiments of the present invention. Methods and systems to provide guided workflows to a customer are also depicted in and described in association with FIG. 1. The methods and systems may include a user interface 102 that may be configured to allow the customer to manage a customer web presence. In an example, a user interface 102 may allow a customer to manage a customer's web presence 118 based on operation of a logic engine 110 that accesses information about what the customer has done (e.g. current web presence 118) and who the customer is (e.g. customer data 124 that may include the customer's type of business). The user interface 102 may present a guided workflow of tasks associated with a recommended area of improvement for the customer. The recommended area of improvement may be related to an aspect of the customer's web presence.

A web presence 118 may include a variety of areas 112 that may be analyzed by a logic engine 110 to determine which area(s) 112 may be improved by applying a guided workflow 108. Determining one or more areas for improvement may be based on a variety of factors including a threshold associated with an area, a model of continuous or progressive improvement of a web presence, comparative ranking, area popularity, a measure of change already made to the area, and the like. In an example of threshold-based determination, each web presence area 112 may be compared to an improvement threshold 114 to determine which area(s) 112 exceed the threshold. These areas may be considered to be acceptable (or at least not necessarily in need of improvement) and therefore other areas that do not satisfy the threshold 114 may be further evaluated for improvement. In an example of a model of continuous or progressive improvement, areas of web presence and/or their impact on a user's web presence may be evaluated periodically or over a period of time so that the user's web presence can be improved by applying a series of improvement steps. A user's web presence may be evaluated for improvement based on its position in a ranked list, and the like. Successive improvement steps may include improving different web presence areas, determining a web presence area for improvement based on previous improvement steps, and the like. In an example of a determining a candidate are for improvement 104 based on a measure of change already made to an area, a record of improvement attempts to any area or a range of related areas may be consulted. If the record indicates that an area has been through an improvement cycle recently, further attempts at improvement in the area may be deferred to allow the improved area time to have an improving impact. In an example of comparative ranking, similar web presence areas from a plurality of users (e.g. similar users) and/or the improvement attempts made to those areas may be compared to compare the improvement efforts for a current user to the plurality of users. If several users had improvements in two different web presence areas, the area that resulted in the greatest improvement might be selected as a candidate area 104 for improvement. In another example of comparative ranking, areas of web presence may be grouped into related sets (e.g. communication, content, metadata, social networking, and the like) may be evaluated for determining the one or more for which the user needs most improvement, such as relative to others in the same industry. This might be based on a ranking of the customer's web presence to its peers. A set of areas in which the user is ranked lowest among peers may signify that improvement in one of the related areas in the set could be beneficial. In an example of area popularity-based determination, data regarding similar customers may be analyzed to determine which web presence areas are popular to help pinpoint one or more areas to improve. Areas that are least popular may not be as likely to improve a user's web presence as areas that are more popular.

For any given area 112 needing improvement, called a web presence improvement candidate 104, the logic engine 110 may evaluate a variety of data sources, analysis results, and the like to determine at least one recommended work flow 108 for improving the candidate 104. The logic engine 110 may access data such as user data 124 that may include information about a particular customer for whom a recommendation regarding an area of improvement may be prepared. The logic engine may also access customer data 124 for other customers, such as other customers for whom the logic engine 110 has provided web presence improvement workflows 108, and the like. The logic engine may access data representing any number of different customers to facilitate determining a workflow 108 for improving a candidate web presence area 104. Customer data 124 may include customer data for a variety of web hosting customers, including former web hosting customers. The logic engine 110 may be configured to access information about the customer including customer activities such as, for example, but not limited to, customer business, customer profile information, and the like to determine a recommended area of improvement for the customer's web presence.

The logic engine 110 may further access a customer's current web presence 118 and information about the customer such as who the customer is, market information about the customer, existing web presence areas, and the like. A customer's web presence may be supplemented with information about the customer that is accessible through Internet search engines and the like. Other sources may include industry directories, corporate registrations, government records, and the like. The logic engine may combine this customer web presence-related information with the customer information 124 when determining a recommended workflow 108 for improving a candidate web presence area 104.

A guided workflow 108 may be derived from a sequence of workflow tasks (108A, 108B, 108C, etc). The tasks and relationships among the tasks, such as which tasks must precede other tasks, and which tasks are candidates for executing subsequent to execution of a given task may be stored in a workflow task library 120 that may be accessible to the logic engine 110. The logic engine 110 may access the library 120 to select a task based on the improvement candidate area 104, the customer data 124, the current web presence 118 and other information. The logic engine 110 may use the task relationship information to identify candidate tasks and/or conditional tasks to be included in the guided workflow 108 to be presented on the user interface 102. The library 120 may have a variety of tasks that help on a particular area of web presence. Those tasks may be undertaken in more than one possible sequence, such that at any given point, a next task may be selected by the logic engine 110 that contributes to an improved web presence. The customer might complete all tasks presented in a guide workflow, or might just do one of the tasks, but in either case the result of executing the guided workflow is that the web presence should be improved. The logic engine may identify a next task based on a variety of factors including being based on where the customer is in the web presence improvement process. In an example, if the user has indicated a budget for improving web presence and the user has taken web presence improvement tasks in one or more guided workflows that substantially consume the entire available budget, the logic engine may present a low or no cost web presence improvement task. Alternatively, the logic engine may provide an indication of the use of the budget and give the user the opportunity to close out the web presence improvement process, increase the budget, or the like.

In an alternate embodiment, a guided workflow may be based on an amount of time that the user has available for improving web presence during a particular web presence improvement session. In an example, the customer may be asked about how much time is available so that tasks that can improve the user's web presence in a given amount of time are recommended. Further in the example, a user might have five minutes available, which might give enough time to add the customer's contact information to a page. If the user indicates that an hour might available, the logic engine may present web presence improvement tasks that enable setting up links among pages, creating search engine metadata, connecting to a social networking site, and the like.

A guided workflow 108 may also be based on criteria and templates of web presence objects/elements that may be stored in a web presence objects dataset 122. Web presence objects dataset 122 may also include information about web presence areas, improvement thresholds, and the like that may be used by the logic engine 110 to select web presence improvement area candidates 104.

The logic engine 110 may combine and analyze input from the various sources described herein to generate content and/or guidance for display and/or interactive presentation of a guided workflow on user interface 102. In an example, the logic engine 110 may determine a plurality of candidate areas of web presence improvement 104. The candidates 104 may be further filtered by reviewing customer data 124 (e.g. web hosting service level) and combining with an analysis of a user's current web presence 118 to determine at least one candidate area 104 for improvement. The selected area for improvement can be presented to the user through the user interface 102 along with at least one guided workflow 108 for improving the candidate web presence area 104. The guided workflow 108 may, when executed, result in an improvement in the candidate area 104 such that the area 104 is no longer below the improvement threshold 114.

Figure 1A:
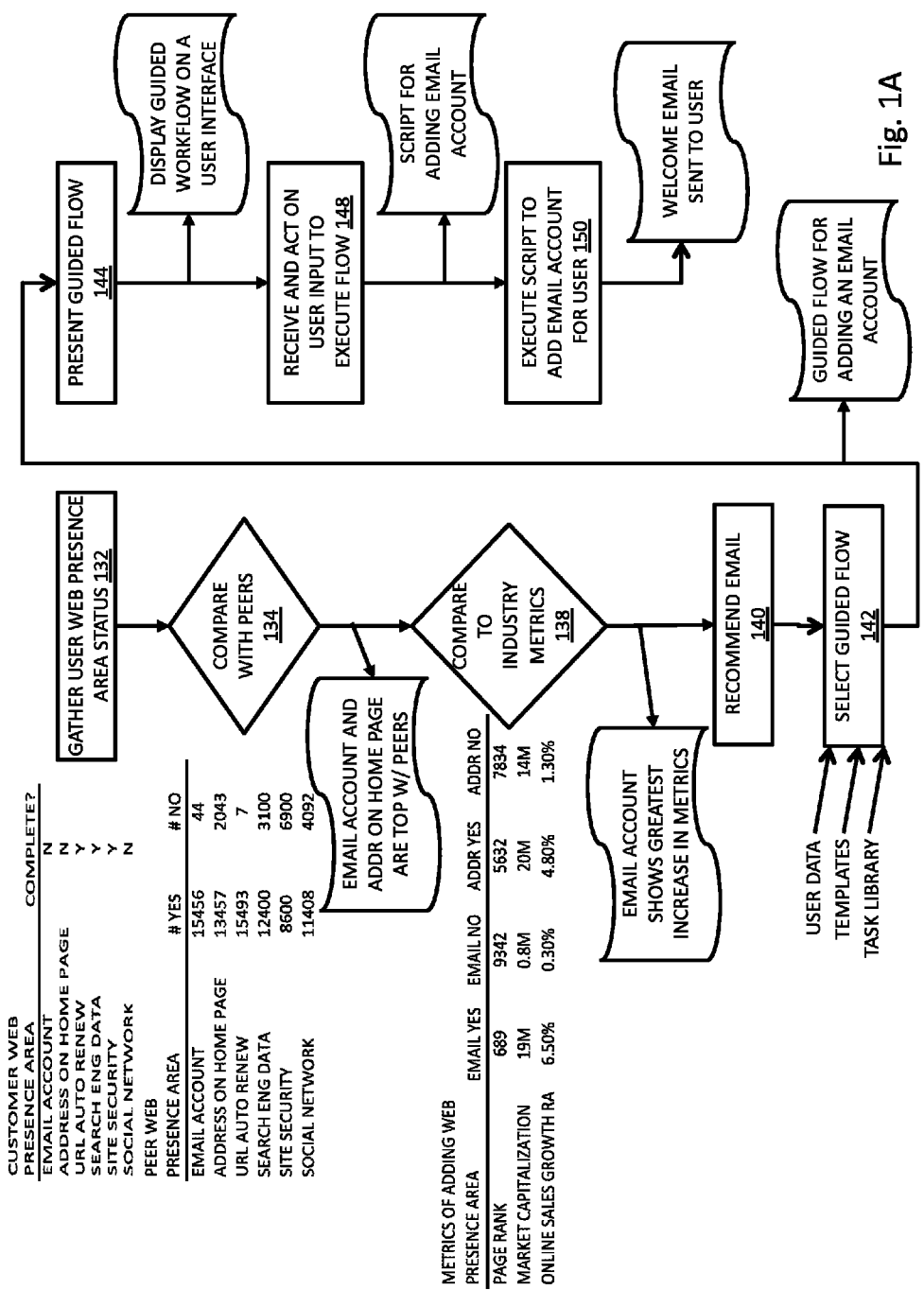
FIG. 1A depicts an exemplary end-to end flow of a logic engine for the Engage platform.

An exemplary flow of steps that are processed by the logic engine 110 is shown in FIG. 1A. In the example, an area of improvement is recommended; a guided workflow is selected; the guided workflow is presented to the user and user input is integrated with the guided workflow to create a script for adding/improving the recommended area of improvement; the script is executed and the user is notified of the completion of the web presence improvement. The particular example of FIG. 1A involves a user's web presence being evaluated by logic engine 110, which starts with the logic engine 110 gathering the status of the user's web presence areas 132. The status of a customer's web presence in areas such as email account, address on home page, URL auto-renew, search engine data, site security, social network and the like is gathered to facilitate recommending an area of improvement. In the particular example of FIG. 1A, email account, address on home page, and social network all appear as potential candidates for improvement based on the status that each has not yet been completed by this client.

The logic engine exemplary flow of FIG. 1A continues with the logic engine 110 comparing the user's web presence status with peers 134 (e.g. similar entities, industry peers, web hosting customers who have a similar web presence, etc) to determine which of the three candidate areas of improvement might yield the greatest value. In this example, the logic engine 110 determines that the difference in counts of peers with email and with an address on the home page versus those without is greater than difference in counts of peers with a social network presence and those without. Therefore, the email account web presence area and the address on home page web presence area persist as candidate improvement areas.

The logic engine exemplary flow of FIG. 1A continues further with the logic engine comparing the candidate improvement areas with industry metrics 138 regarding the areas. Exemplary industry metrics include page rank, market capitalization, on-line sales growth rate, and the like. The logic engine may determine the potential benefits of including and address on the homepage for these metrics versus having no address on a homepage. Likewise the logic engine may determine the differences in these metrics for users who have an e-mail account versus those users do not have an e-mail account. The logic engine may further determine whether making improvement in the e-mail account web presence area or the address on home page web presence area will be the most likely to provide the greatest increase in metrics for the user. In the particular example of FIG. 1A, the e-mail account web presence area is determined to show the greatest potential for increased metrics. The logic engine may therefore recommend 140 adding an e-mail account for the user.

Logic engine 110 may then recommend adding an e-mail account for the user. Subsequently the logic engine may identify 142 a guided workflow that is suitable for adding an e-mail account to a user's web presence. Determining the proper guided workflow may include accessing data such as user data 124, web presence templates 122, workflow library 120, and the like as described in the embodiment of FIG. 1. The logic engine may present 144 the guided workflow to a user in a user interface. The user may input customization information such as a username password, and the like that the guided workflow made requests through the user interface. Logic engine may execute guided workflow 148 based the user inputs to generate a script that is suitable for adding the e-mail account.

The script for adding e-mail account may be executed A50 by the logic engine or another suitable Web server or computer. The result may include the user receiving a welcoming e-mail message in the newly added e-mail account. The script may also include configuring a user's web browser with a favorite for accessing the user's email. Likewise the script may include configuring a user's email program, such as OUTLOOK® or APPLE MAIL® to properly access the newly established user's email account.

We note that the term "web presence" described herein may be defined as a persona, an identity, and/or a communication medium of the customer, as well as the underlying content, such as pages, URLs, email addresses, and the like, that embody or create the identity or persona. The web presence described herein may include at least one of the electronic communications medium such as email, video conferencing, electronic chatting, instant messaging, and the like; website, domains such as domain names, URLs, and similar indication of location and identity or persona; presence on social networking sites, communication streams such as Facebook® or Twitter® and other web-related elements. The term "web" described herein may define the fixed Internet, wireless Internet, and mobile web such as enabled by Hyper Text Transfer Protocol (HTTP), Wireless Application Protocol (WAP), Wi-Fi, Wi-Max, and the like.

The customer described herein may include, for example, but not limited to, at least one of a customer, a reseller, an affiliate, a customer of a customer, a domain registrar, a web services provider, a cloud services provider, a network services provider, an online services provider, an Internet service provider, an online advertiser, a campaign manager, and the like. In an aspect, the logic engine 110 may be configured to interact with the databases, such as 120, 122, and 124, to determine the guided workflow of tasks, such as the workflow task 108, associated with the recommended area of improvement for the customer.

The guided workflow 108 may include a decision tree that may allow the customer to choose one or more paths. Alternatively, the paths available to a user may be limited based on context and other input data variables as described herein. The paths described herein may include for example, but not limited to, a most traveled path by a customer type, a most successful path traveled by other customers, an easiest next path, path based on customer activities, and the like. Path conditionality and determination may further be based at least in part on the status of a customer issue ticketing process that is associated with the customer. The ticketing process may resolve the customer issues through the guided workflow of tasks. The process may include a discrete element that may be kicked off and tracked around the guided workflow of tasks. The guided workflow may be associated with the market of the customer.

Figure 2:
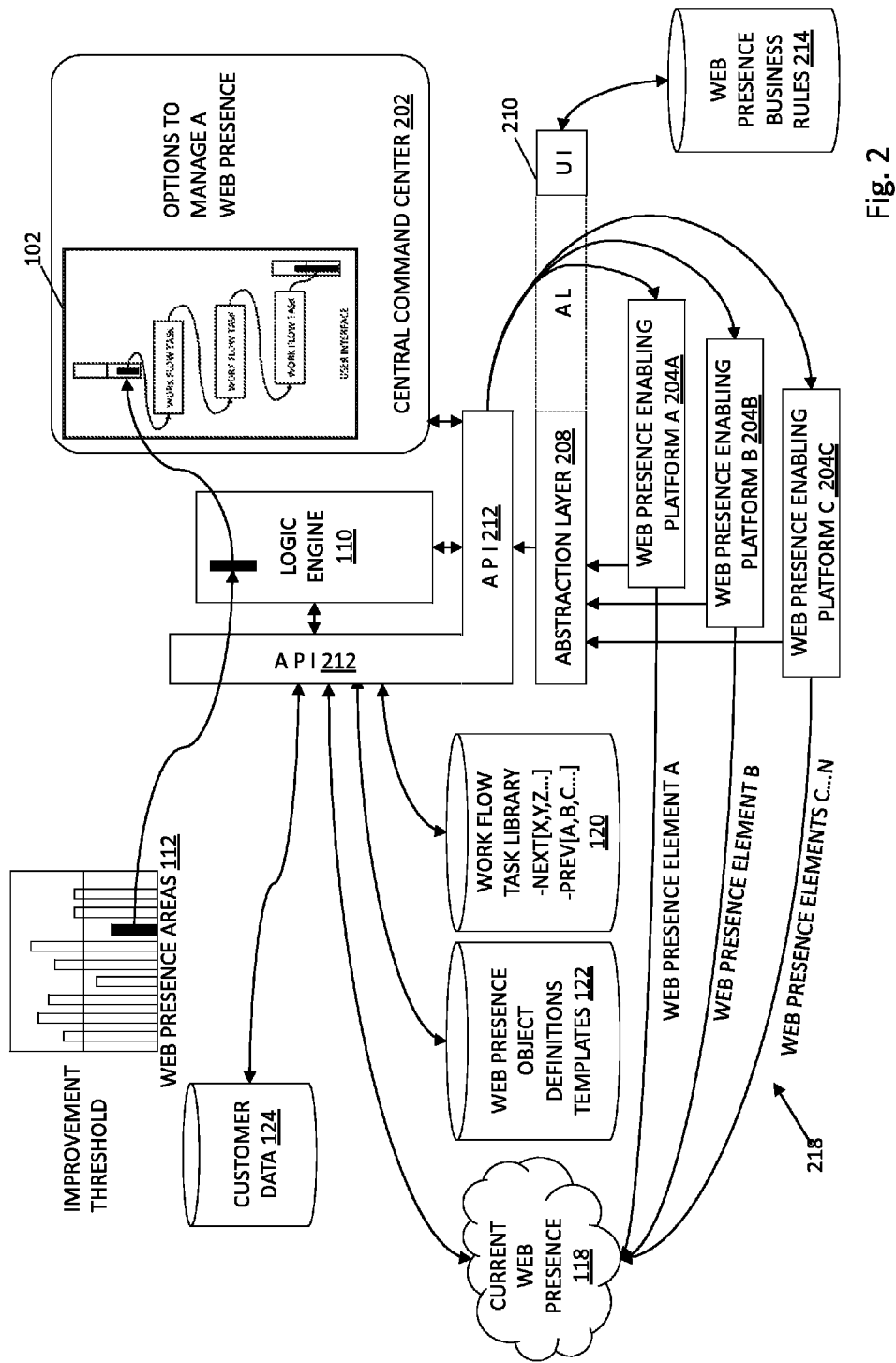
FIG. 2 depicts an example of a central command center for presenting various options to a customer to manage customer web presence.

Methods and systems including a central command center 202 for presenting various options to a customer to facilitate managing the customer's web presence through the user interface 102 are depicted in FIG. 2. The central command center 202 may allow the host to present options to the customer to allow the customer to manage the customer's web presence. The central command center 202 may be operationally coupled or associated with the logic engine 110 to access and process information about the customer activities and provide a recommended workflow of tasks associated with an area of web presence improvement. The command center 202 may communicate with the databases such as 120, 122, and 124, as described in association with FIG. 1 in association with the logic engine 110 to provide a recommended guided workflow of tasks associated with an area of web presence improvement for the customer.

In particular, the embodiment of FIG. 2 depicts a central command center for allowing a host to present options to a customer to allow the customer to manage the customers' web presence, wherein the command center is associated with one or more of (A) a logic engine that accesses information about what a customer has done and who the customer is (e.g. customer's type of business) and provides a recommended workflow of tasks associated with an area of web presence improvement for the customer; (B) one or more platforms for enabling elements of web presence; (C) an abstraction layer that allows the host to manage web presence enabling elements in a unified user interface independent of a native language of a platform; and (D) a host API module that takes input from the abstraction layer and initiates actions on the platform to enable the web presence. The abstraction layer may further include a user interface that may permit a host to enter business rules for establishing and/or executing workflows associated with the customer's web presence.

The central command center 202 may be configured to be coupled to or associated with one or more web presence enabling platforms 204 through an abstraction layer 208 and a host application programming interface API 212. In an aspect, each web presence enabling platform 204 described herein may be a platform of a web hosting provider, a platform of a third party, a social media platform, an online campaign platform, or the like. Each web enabling platform 204 may facilitate providing certain web presence elements 218. Through interactions between the central command center 202 and the web presence enabling platform 204 (e.g. via an abstraction layer 208), web presence element(s) 218 associated with the enabling platform 204 may be enabled in a user's web presence 118.

The web enabling platforms 204 may communicate with the command center 202 via the abstraction layer 208 that may facilitate managing web presence enabling elements in a unified user interface that is independent of the native language of the platforms 204. The abstraction layer may facilitate data reformatting, data translation, language and other translation, standardization of web presence element attributes or definitions, normalization of data and web presence related elements, and the like.

Communication among the web presence enabling platforms 204 and the central command center 202 may be further enabled by an application programming interface (API) 212. The API 212 may facilitate automation and/or computer-to-computer communication. The API 212 may receive abstracted web presence enabling platform 204 communications from the abstraction layer 208 and may interface the abstraction layer 208 with the central command center 202 and/or the logic engine 110. In a similar way, the API 212 may facilitate initiating actions on the platform 204 for enabling web elements, such as by sending information, data, queries, commands, and the like from the logic engine 110 and/or the central command center 202 to the web presence enabling platforms 204. The API 212 may optionally communicate with the web presence enabling platforms 204 via the abstraction layer.

The central command center 202 may be configured to be coupled to or associated with an abstraction layer 208 that allows the host to manage web presence enabling elements in a unified user interface independent of the native language of the platform 204. The abstraction layer 208 may implement or include the operations or functions performed by the central command center 202. The abstraction layer 208 may include or implement a user interface (UI) 210 that may allow the host to manage establishing and/or maintaining business rules for establishing workflows to manage the web presence enabling elements for the customer.

In a general embodiment, the central command center 202 may allow a host (not shown) to present options to a customer to allow the customer to manage the customer's web presence. The central command center 202 may be associated with one or more web element enabling platforms 204 to facilitate enabling particular elements of web presence for the customer. The central command center 202 may be associated with the host API module 212 that may take input from the host system and initiate actions on the platforms 204 for enabling web elements. The host API module 212 described herein may allow the central command center 202 to perform the operations instructed by the host system. Further, the host API module 212 may communicate with the logic engine 110 to allow interaction with platform 204 or any other host system to determine the workflow of tasks for the customer. The host API module 212 may act as a middleware or a medium for interaction among the central command center 202, host system, the platform 204, and the like. The host API module 212 may optionally facilitate the logic engine 110 interacting with and/or gaining access to customer data 124, web presence object definitions/templates 122, workflow task library 120, web presence areas 112, and the like.

The guided workflow that may be generated through use of the central command center 202 may also be based on information about user activities. The information described herein may include market activity data, other customer activity data, systems activity information, customer's competitor activity data, activity search results, and the like.

The central command center 202, in association with the abstraction layer 208, may allow the host to manage apply business rules to the creation of workflows. The abstraction layer user interface 210 of the abstraction layer 208 may permit the host to identify, apply, and manage the business rules. The abstraction layer user interface 210 may communicate with a web presence business rules database 214 to facilitate establishing business rules for workflows associated with the customer's web presence.

Methods and systems to provide an instant profile wizard for creating an online presence of the customer are depicted in 3. The methods and systems may include a profile-based wizard 302 that may be configured to create a customized web presence 304 of the customer. The profile-based wizard 302 described herein may be an instant and customized profile wizard, and may be presented by the system based on the customer information. The profile-based wizard 302 may be configured to create the online presence of the customer. The profile-based wizard 302 may be operationally coupled to the logic engine 110 to allow the customer to create a customized web presence 304. The profile-based wizard 302, in communication with the logic engine 110, may be configured to use the basic profile information of the customer to create online presence of the customer. Further, the profile-based wizard 302 may include one or more workflow tasks 108 described elsewhere herein arranged into a web presence workflow to allow the customer to create the customized web presence 304.

Figure 3:
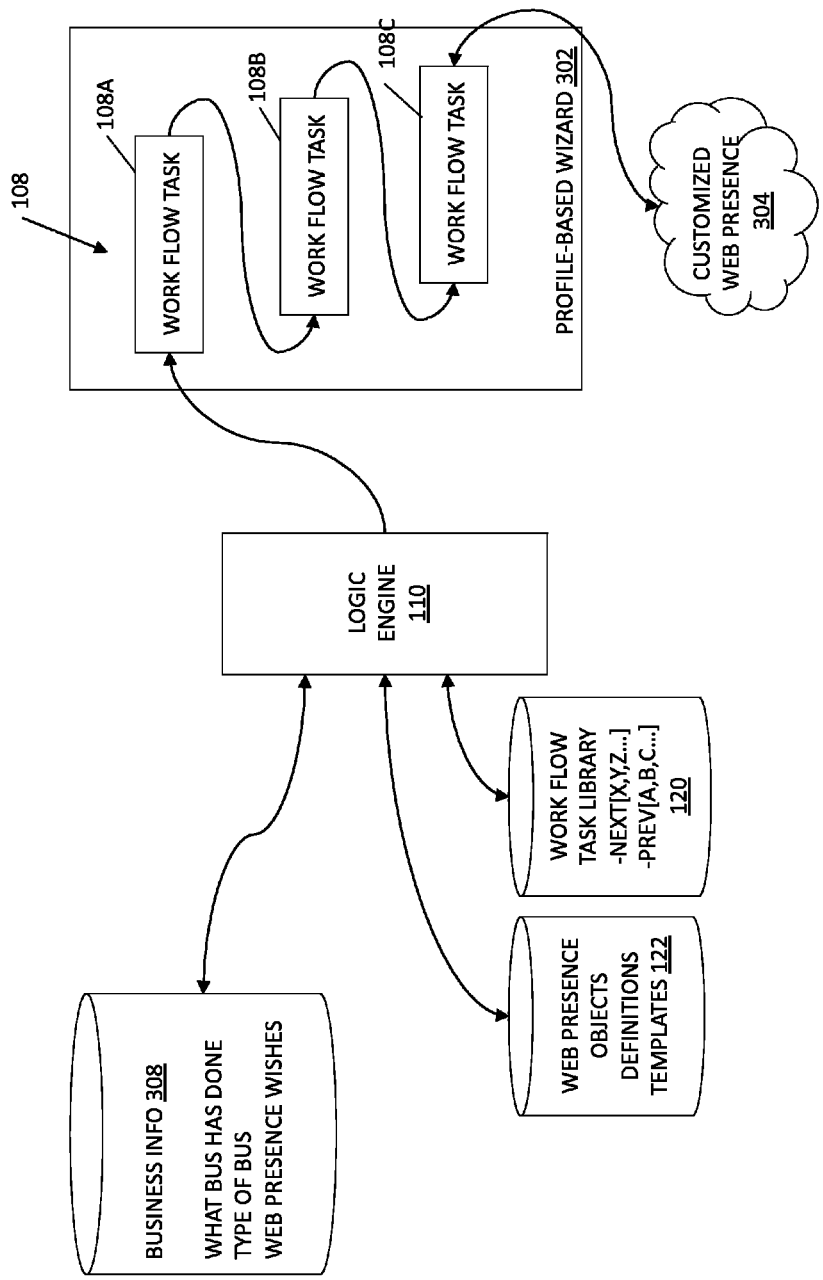
FIG. 3 depicts an example of an instant profile-based wizard for facilitating creation of a customized web presence.

The profile-based wizard 302 may communicate with the logic engine 110 to generate the workflow task 108 for the customer. The logic engine 110 may also be configured to access the information about the customer to generate workflows for the profile-based wizard, thereby using customer-related information to generate input for the profile-based wizard. In the example of FIG. 3, a business info database 308 may be configured to include information about the customer that the logic engine 110 may use as described herein. The business info data base 308 may include customer business information, customer profile information, market data, other customer data, systems information, customer's competitor data, search results, and the like.

In addition to the business info database 308, the logic engine 110 may be configured to access the information from the web presence objects database 122 and/or the workflow task library database 120 as described elsewhere herein to generate the workflows and/or to embed them in the profile-based wizard 302 to facilitate allowing the customer to create the online presence 304.

In another example, a new web hosting client may receive a customized profile-based wizard 302 in response to purchasing at least one of service from such as the web domain, a hosting service package, and the like. The information gathered during the purchase activity may be sufficient to enable the logic engine 110 to generate a workflow 108 for the customized profile-based wizard 302 to enable generating the customized web presence 304.

Figure 4:
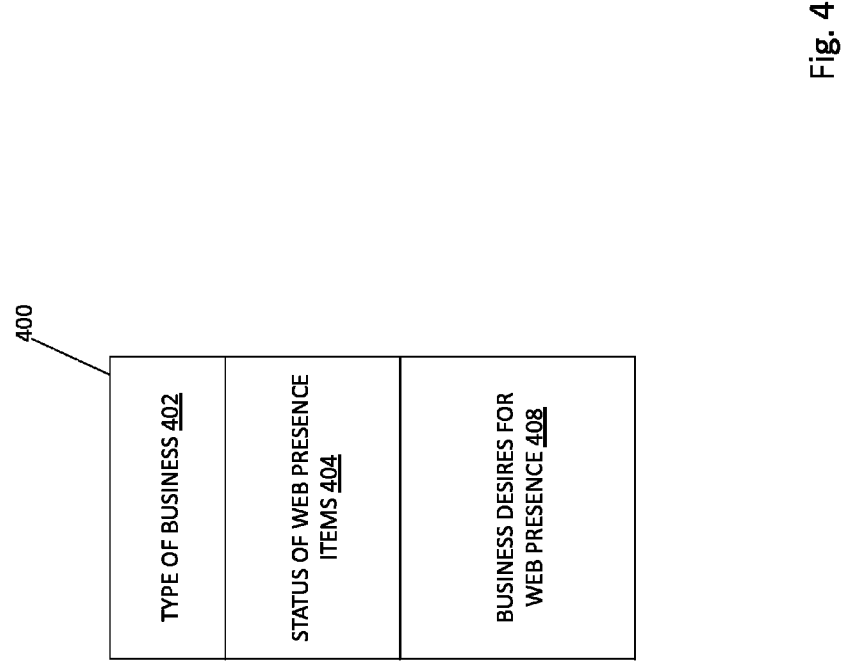
FIG. 4 depicts a block diagram of a data structure for facilitating instant creation of a web presence.

FIG. 4 depicts a diagram illustrating generally, among other things, an example of a data structure 400 that may facilitate creating a web presence for a customer. The data structure 400 may be configured to store and organize information such that the information can be instantly used by a logic engine to create the web presence of the customer. The data structure 400 may be configured to include information about the type of business 402, information about status of web-presence items 404, and information about the business desires for web presence 408. The information stored in the data structure 400 may be related to and/or may define the business requirements for the web presence of a business, and the like.

Figure 5:
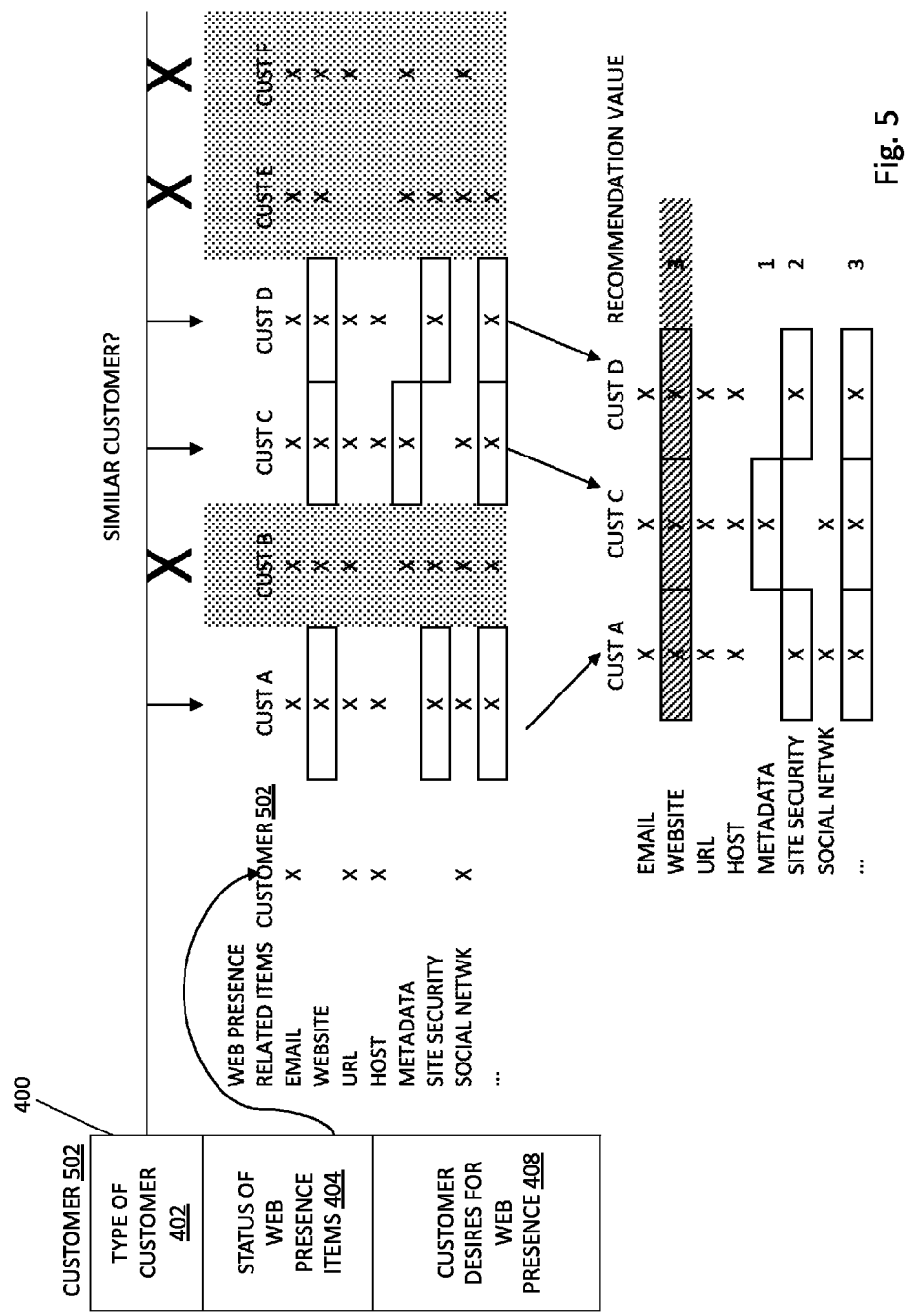
FIG. 5 depicts an example of providing a recommended next action to improve a web presence of a customer.

Methods and systems for providing web presence improvement recommendations to a customer are depicted in FIG. 5. Information about a customer, such as a type of customer, status of web presence items of a customer, desires for web presence, and the like may be used to provide web presence improvement recommendations to the customer. In particular, the method of FIG. 5 depicts a method of (i) collecting information about the status of what web-presence related items a customer has completed and information about the type of customer; (ii) comparing the completed items to a set of items completed by similar customers; (iii) and recommending a next action for the customer to modify its web presence. Customer related data stored in a dataset 400 described elsewhere herein facilitates determining the status of web presence related items. The status of these web presence related items for other customers could also be determined (e.g. from each customer-specific reference in the dataset 400). A subset of all customers may be selected for comparison with the specific customer's web presence status. This subset may be similar customers wherein the similarity is based at least in part on the type of customer 402, and the like. Once a subset of similar customers is identified, the status of each customer's web presence items may be evaluated to determine at least one web presence element for recommending to the customer to enable. In the example of FIG. 5, the web presence items that are not completed by the customer 502, but are completed by the similar customers are outlined to further help identify candidate web presence items to recommend.

The data structure 400 may be configured to collect and store the information about the type of business 402, information about status of web-presence 404, and information about the customer 502 desires for web presence 408. The data structure 400 may be configured to include the web presence items such as email, website, Uniform Resource Locator (URL), host, metadata, site security, social network, and the like.

Information about the status of the web-presence related items completed by other customers may be analyzed to identify candidate web presence items for recommending to the customer 502. For example, the web presence items that have been completed by customers A-F are marked with an "x" below each customer A-F. Customers with a type of customer reference that is similar to the customer 502 for whom the recommendation is being generated (e.g. A, C, D) may be separated out from the customers that are not similar (e.g. B, E, F). In this web-presence item status of only similar customers may be further analyzed. The further analysis may include, among other things, determining which of the web presence items the greatest number of similar customers has completed. In the example of FIG. 5, the "website" web presence item appears to be completed by the greatest number of similar customers so this web presence item may be recommended to the customer 502. This is but one example of how a web presence item may be recommended to a customer.

Some of these similar customers may have been guided to complete one or more of the web presence items (e.g. through a guided workflow as described herein). Alternatively, these similar customers may have completed the items without such guidance.

Figure 6:
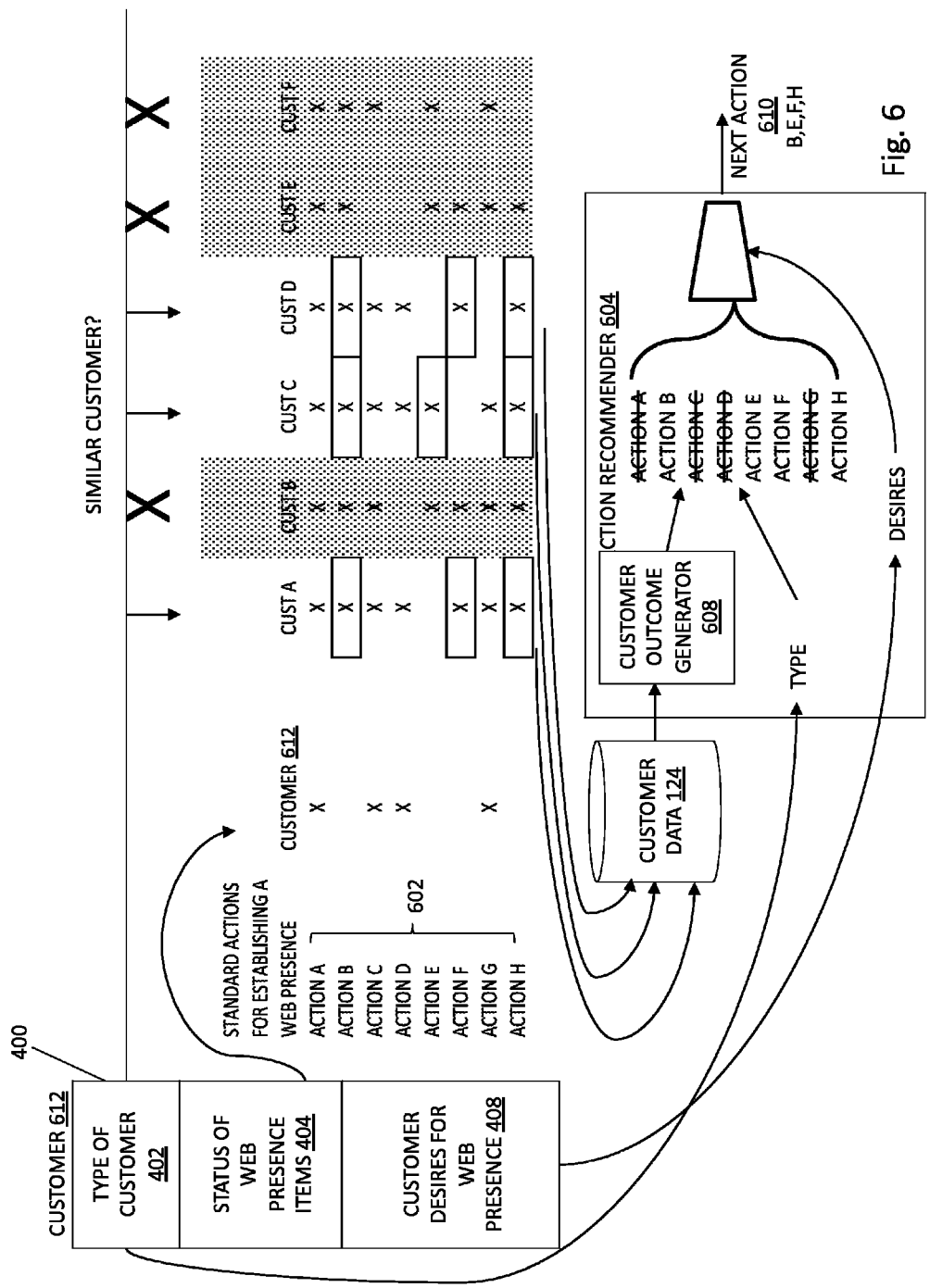
FIG. 6 depicts an example of a recommendation generation algorithm for generating recommended actions for a customer.

In a process that may be similar to that described in regards to FIG. 5, methods and system for selection of recommend actions for a customer based on outcomes of similar customers is depicted in FIG. 6. In particular, FIG. 6 presents an algorithm for selection of a recommended next action for improving the web presence of a customer 612 based on at least one of the type of customer, the status of completion of a set of standard actions for establishing a web presence, and outcomes achieved by similar types of customers that took steps not yet completed by the customer 612. Customer data may be retrieved from dataset 400 described in detail in association with FIG. 4 herein. The customer data may be used to provide a next recommended action 610 for improving the web presence of the customer by allowing analysis of the customer status, type, and comparing these aspects of web presence to other similar customers to determine actions taken by the other customers that are not yet taken by the customer 612. Outcomes from these similar customers who have taken actions not yet taken by the customer 612 can be determined (e.g. by a customer outcome generator 608 based on customer data 124) and used to further help identify candidate actions for recommending to the customer 612. Customer information, such as status and type, desires, and the like may be applied to this candidate list (e.g. by a next action recommender 604) to identify, such a by filtering the candidate list, a particular next action 610 to recommend to the customer 612 to improve the customer's web presence.

The example of FIG. 6 includes a data structure 400 that may be configured to store the customer's status of web presence items 404 as described in association with FIG. 5 that may include the customer's status of standard actions 602 for establishing a web presence.

The methods and systems may be configured to include a next action recommender 604 to recommend the next actions to the customer as described herein. The next action recommender 604 may generate the recommended next action for improving the web presence of the customer based on at least one of the type of customer, the status of completion of a set of standard actions for establishing a web presence, the customer's recent action activity, the customer's desires, outcomes achieved by similar types of customers that took steps or actions not yet completed by the customer, and the like.

The information about the steps or actions completed by similar customers may be used to reference customer information from a customer database 124 to preparing information that is relevant to determining customer outcomes. For example, as shown in FIG. 6, the particular customer for whom a recommended next action is being generated and similar customers A, C, and D have completed actions A, C, D, and G. However, these similar customers have also completed actions B, E, F, and H that the particular customer has not yet completed. These additional completed actions can be used to access the customer database 124 to provide information relevant to outcomes to a customer outcome generator 608 to help determine customer outcomes based on these completed actions. The next action recommender 604 may use this outcome information to recommend one or more next actions to the customer 612. The one or more recommended next actions may further be based on the customer type 402 and/or customer desires for web presence 408.

Figure 7:
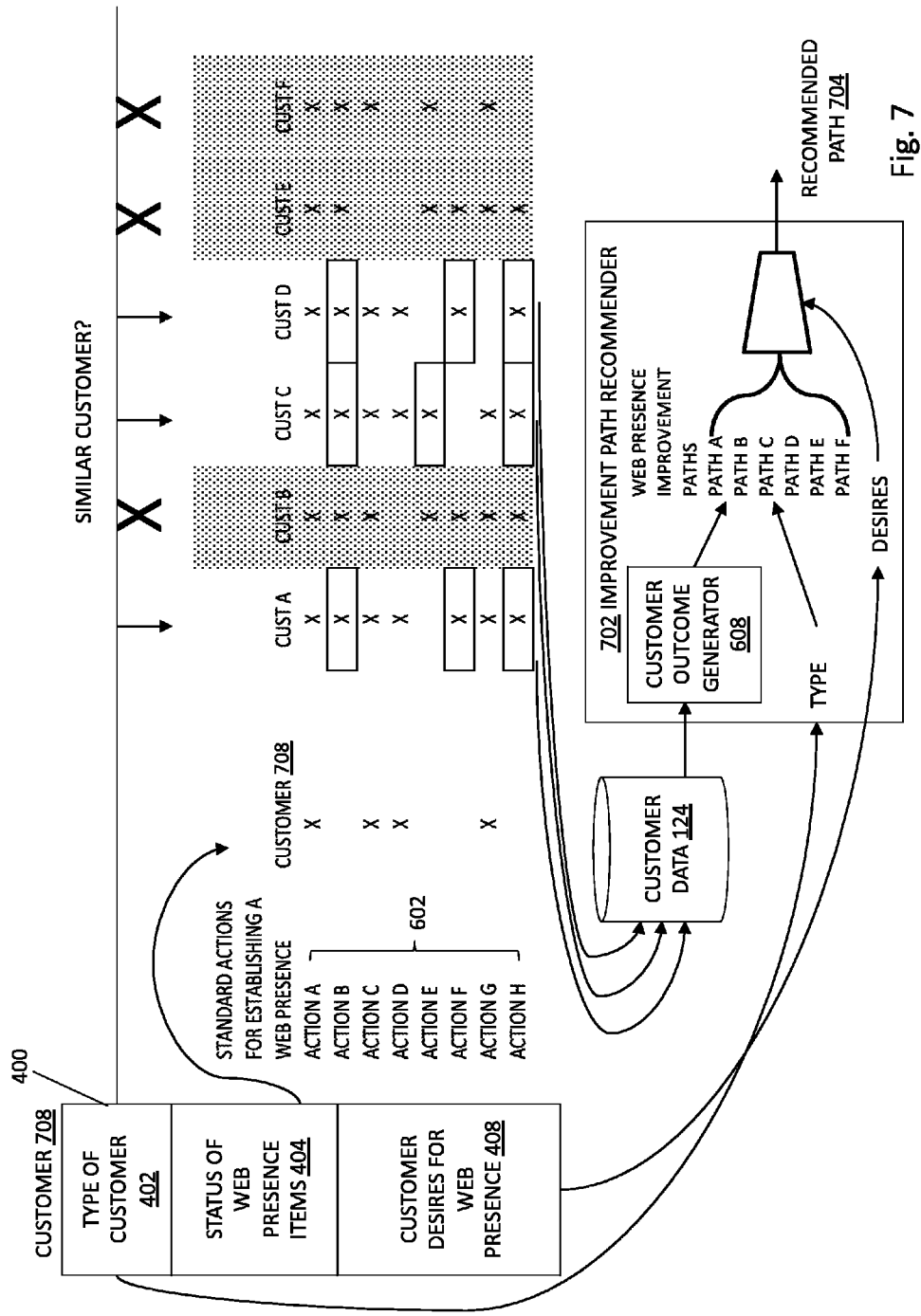
FIG. 7 depicts an example of a recommendation generation algorithm for generating a recommended path for a customer.

Referring now to FIG. 7, the methods and systems of FIG. 6 can be adapted to provide a recommended path 704 for a customer. In particular, FIG. 7 depicts an algorithm for selection of a recommended path for improving the web presence of a customer based on at least one of the type of customer, the status of completion of a set of standard actions for establishing a web presence, desires of the customer, and outcomes achieved by similar types of customers that took steps not yet completed by the customer.

Customer data may be retrieved from dataset 400 described in detail in association with FIG. 4 herein. The customer data may be used to provide a next recommended path 704 for improving the web presence of the customer 708 by allowing analysis of the customer status, type, desires, and comparing these aspects of web presence to other similar customers to determine actions taken by the other customers that are not yet taken by the customer 708. Outcomes from these similar customers who have taken actions not yet taken by the customer 708 can be determined (e.g. by a customer outcome generator 608 based on customer data 124) and used to further help identify candidate actions for recommending to the customer 708. Customer information, such as status and type, desires, and the like may be applied to this candidate list (e.g. by an improvement path recommender 702) to identify (e.g. by filtering based on customer desires) a particular next path 704 to recommend to the customer 708 to improve the customer's web presence.

The example of FIG. 7 includes a data structure 400 that may be configured to store the customer's status of web presence items 404 as described in association with FIG. 5 that may include the customer's status of standard actions 602 for establishing a web presence.

The methods and systems may be configured to include an improvement path recommender 702 to recommend a path to a customer as described herein. The improvement path recommender 702 may generate the recommended improvement path for improving the web presence of the customer 708 based on at least one of the type of customer, the status of completion of a set of standard actions for establishing a web presence, desires of the customer 708, recent actions taken by the customer 708 outcomes achieved by similar types of customers that took steps or actions not yet completed by the customer 708, and the like.

The information about the steps or actions completed by similar customers may be used to reference customer information from a customer database 124 to preparing information that is relevant to determining customer outcomes. For example, as shown in FIG. 7, the particular customer 708 for whom a recommended improvement path is being generated and similar customers A, C, and D have completed actions A, C, D, and G. However, these similar customers have also completed actions B, E, F, and H that the particular customer 708 has not yet completed. These additional completed actions can be used to access the customer database 124 to provide information relevant to outcomes to a customer outcome generator 608 to help determine customer outcomes based on these completed actions. The improvement path recommender 702 may use this outcome information to recommend one or more web presence improvement paths to the customer 708. The one or more recommended improvement paths may further be based on the customer type 402 and/or customer desires for web presence 408.

As described herein, recommendations for web presence improvement may be based in part on standards, other customer's actions and outcomes, and the like. However, a customer's desires may provide a critical element of filtering of such recommendations so that candidate recommendations may be filtered or prioritized according to client desires that are explicitly expressed or inferred In an example of web presence-related recommendation (e.g. an element, action, path, and the like), a customer may identify marketing as a desire 408. The analysis of similar customers described at least in FIGS. 5, 6, and 7 may suggest recommending one or more of blogging, email, and security for improving the customer's web presence. However, because of the customer's desire for marketing, the candidate recommendations may be filtered based on a relevance of the candidate recommendations to the customer desire of marketing which may result in email being recommended for web presence improvement as it may have a greater likelihood of fulfilling a marketing desire than blogging or security.

Recency of customer actions may also be factored into recommendations for web presence improvements. In an example of recency impacting web presence improvement recommendations, a user's recent actions resulted in publishing a website. Therefore, because the steps that the customer most recently performed related to publishing a website, recommendations for next actions, web presence improvements, paths, and the like may use these recent website publishing actions as an indication for what might be recommended. In another example, if a user's most recent actions were to add blogging capabilities to the user's web presence, a recommended next action might be related to having just initiated such a blogging capability—e.g. to promote the blog.

The methods and systems described herein for web presence recommendations and improvements may also be combined with advertising and/or promotional facilities, such as to enhance the value of a web hosting client to a web hosting provider. At least the final recommendations and/or intermediate results (e.g. candidate recommendations, customer outcomes, and the like) may be used to target promotion of products and/or services (e.g. an on-line shopping cart service, a foreign currency conversion service, a business card product, and the like). Methods and systems for targeting promotional materials, advertisements, and the like may be combined with the methods and systems of web presence improvement recommendation so that promotional materials may be targeted based on factors such as customer desires, and the like. In a basic example, if a recommended next action is to provide security features for a website, website security providers may be promoted to the user that is receiving the recommended next action. A determination of which product and/or service to promote may also be based on analysis of similar customers' responses to such service or promotion. IN this way, not only can similar customers' web presence related actions be analyzed to determine a next recommended action, but those same (or other) customers' actions in response to a promotion (e.g. in response to receiving an email with a link to a website security provider service or product) may be captured and used for various purposes including determining which promotion to provide to the customer.

Figure 8:
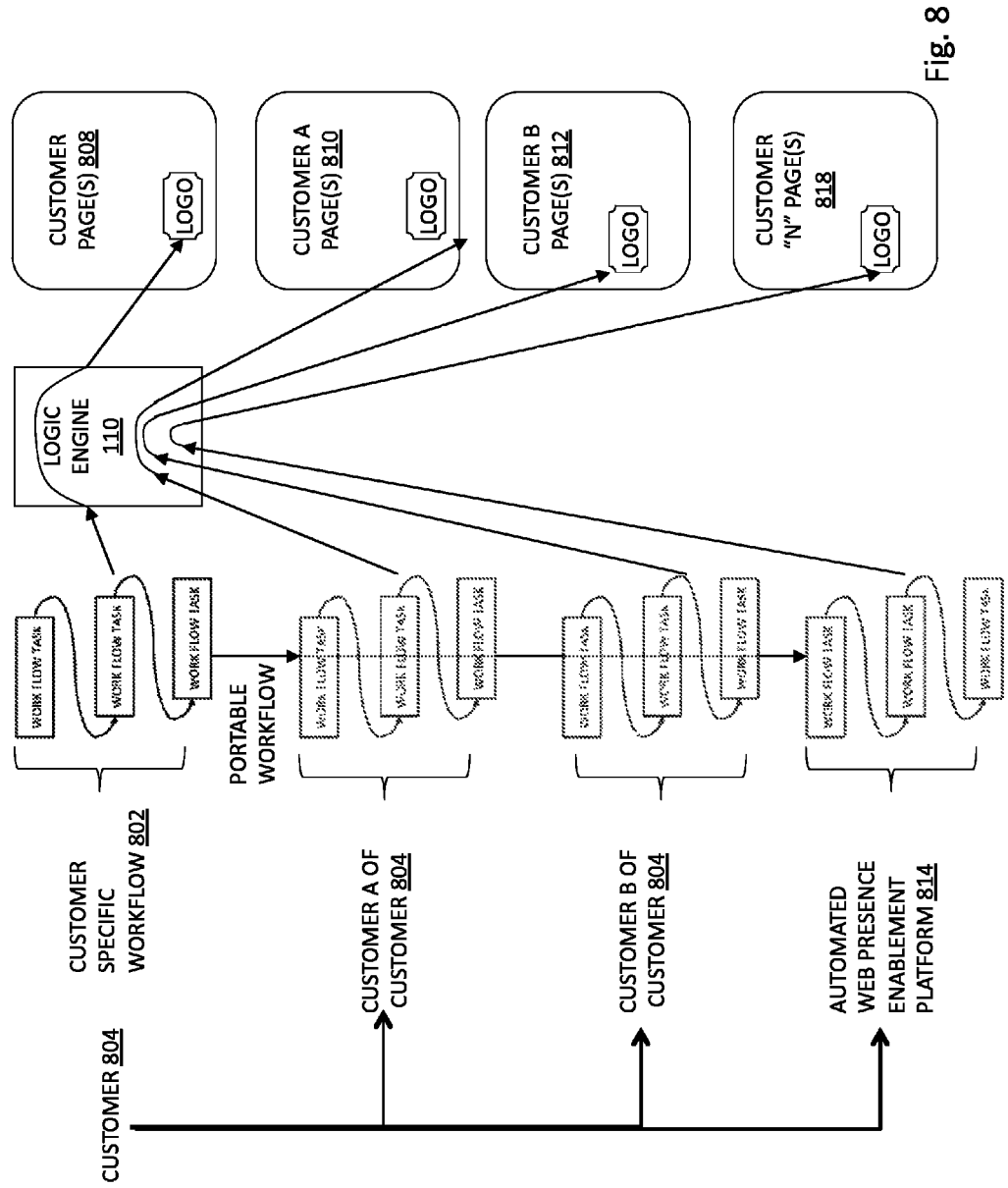
FIG. 8 depicts an example of application of a portable guided workflow for guiding a customer's customer to create an element of web presence.

Methods and systems for providing at least one portable guided workflow for guiding a customer to enable an element of a web presence are depicted in FIG. 8. In particular, FIG. 8 depicts providing at least one portable workflow for guiding a customer through a path of tasks associated with establishing an element of a web presence, wherein upon a customer's performing tasks within the workflow, the element of the web presence is automatically established. Alternatively, FIG. 8 depicts providing a workflow for establishing a customer's web presence, porting the workflow and a link to the logic engine for executing the workflow to a customer's customer, and enabling the customer's customer to use and extend the workflow to establish an element of a web presence. Upon the customer's customer performing tasks within the ported workflow, an element of the customer's customer's web presence is automatically established.

In the example of FIG. 8 customer 804 may generate a customer specific workflow 802 to add a logo web presence element to the customer's web page 808. The workflow may execute on logic engine 110 as described herein to generate the logo web presence element as desired by the customer 804. The customer 804 may configure the customer specific workflow 804 to be a portable workflow that may be ported to customer 804's customer A and/or customer B. Customer A may execute the ported customer specific workflow 802 via the logic engine 110 to place the same logo web presence element that is visible on customer pages 808 onto customer A's web pages 810. Similarly, customer B may use the ported workflow via logic engine 110 to place the logo web presence element on customer B's pages 812. In this way the customer specific workflow 802 may enable a customer's customer to maintain a similar look and feel as customer 804 for at least some web presence elements. The ported workflow may, for example, allow the placement of the logo in a specific location on each of customers A, and B pages, or may allow customers A and B to identify a particular location for the logo. In this way the ported workflow is useable by a customer's customer while enabling a degree of flexibility in establishing the web presence element.

An alternate embodiment of providing a portable work flow may include configuring an automated workflow for use by an automated web presence enablement platform, such as a script-based platform for automatically updating and/or providing web presence elements for users. In an example, customer specific work flow 802 may be ported to automated web presence enablement platform 814 where information such as a user's current web presence elements, indication of web presence interests, web hosting information, and the like may be processed to configure, adapt, and/or provide input to the workflow 802 so that a logic engine, such as the logic engine 110 and/or a web element enablement logic engine associated with the automated web presence enablement platform 814, may process the adapted workflow 802 to provide a web presence element for a user, such as providing a logo on customer "n" web page or pages 818.

Figure 9:
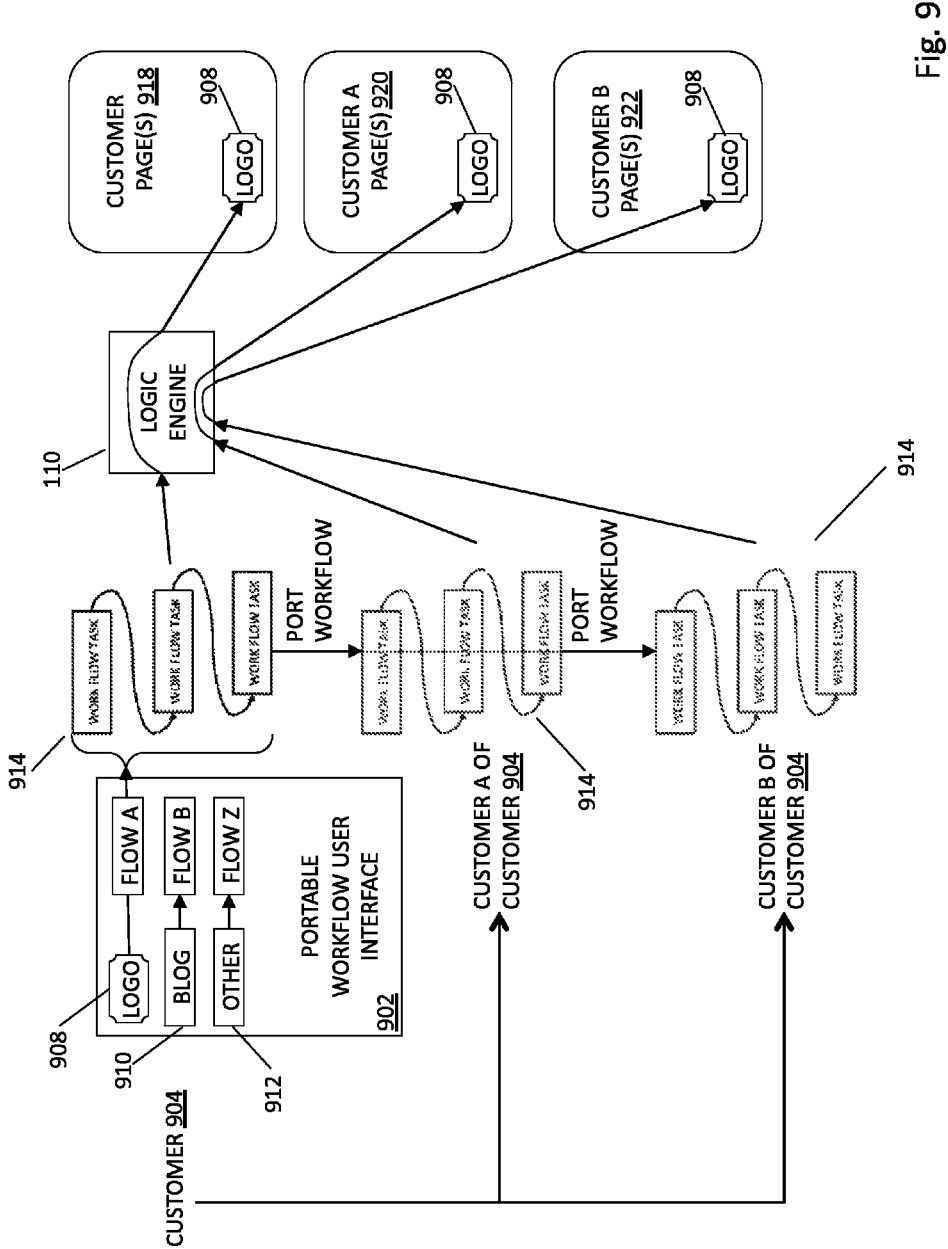
FIG. 9 depicts an example of a user interface for creating a portable workflow for a customer.

FIG. 9 depicts an alternate embodiment of the portable workflow methods and systems of FIG. 8, wherein a portable workflow user interface 902 may be used by customer 904 to generate a portable customer specific workflow 914. The portable workflow user interface 902 may be configured to allow a customer 904 to create workflows 914 for guiding a second customer. The second customer described herein may be, for example, but not limited to, a customer of the customer, a distributor, reseller, a franchisee, subsidiary, foreign office, retailer, service provider, and the like. The portable workflow user interface 902 may allow the customer 904 to create different work flows for enabling different types of web presence elements. For example, the portable workflow user interface 902 may include one or more options to create workflow for web presence elements logo 908, blog 910, others 912, and the like. The logic engine 110 may be configured to process the workflow 914 to improve the web presence of the customer or the customer's customer.

An example of creating a portable workflow for the web presence element type logo 908 is described in detail in FIG. 9. Customer 904 may use the portable workflow user interface 902 to identify one or more web presence elements, such as logo 908. A default workflow may be identified within the user interface 902 for each type of web presence element. By selecting web presence element 908, the portable workflow user interface may direct the user that workflow A will be generated as a portable workflow 914. The portable workflow user interface 902 may further allow the customer 904 to identify other customers (e.g. customer A, customer B, etc) for receiving the portable workflow 914 that enables a logo 908 web presence element. Customer 904, customer A and/or customer B may process the portable workflow 914 via logic engine 110 to enable a logo 908 web presence element on the customer's respective web pages 918, 920, and 922.

The portable workflows depicted in FIGS. 8 and 9 may be generated via the methods and systems for generating a guided workflow for improving a customer's web presence based on an area of improvement for the customer as depicted in FIG. 1.

Similarly the portable workflows depicted in FIGS. 8 and 9 may be generated via the methods and systems depicted in FIG. 2 for generating guided workflows with a central command center that may be associated with a logic engine, one or more web presence enabling platforms, an abstraction layer that may include a user interface for establishing business rules for processing the guided workflow, a host API module, and the like.

Likewise, the portable workflows depicted in FIGS. 8 and 9 may be generated via the methods and systems for generating a workflow with a profile-based wizard as depicted in FIG. 3.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

While the invention has been disclosed in connection with the preferred embodiments shown and described in detail, various modifications and improvements thereon will become readily apparent to those skilled in the art. Accordingly, the spirit and scope of the system and method disclosed herein is not to be limited by the foregoing examples, but is to be understood in the broadest sense allowable by law.

We claim:

1. A computer system, including a memory executable by a processor, for allowing a host to enhance an online web presence of a customer, comprising:
   a customer database stored in the memory, the customer database including customer information at least including customer type and customer history information; a user interface in communication with the customer database, the user interface operable to display a selected workflow task from a guided workflow for a customer input, the guided workflow including at least one of:
   a most frequently used path for a given customer type; a path that has had prior results in enhancing web presence for a given customer type; and
   a path that fits a predefined prioritization scheme; a logic engine in communication with the customer database, the logic engine operable to:

compare a current web presence of the customer with at least one peer to facilitate selection of the workflow task, determine a web presence area of improvement based on the customer information and the current web presence, and select the workflow task from the guided workflow in response to a relationship among workflow tasks in a web presence task library that correlate to the customer information, the determined web presence area of improvement, and the current web presence to facilitate enhancement of the web presence of the customer.

2. The system as recited in claim 1, wherein the logic engine selects the workflow task from the guided workflow to further enhance the web presence based at least in part on a time input by the customer.

3. The system as recited in claim 1, wherein the selected task is based on where the customer is in the web presence enhancement process.

4. The system as recited in claim 1, wherein the logic engine selects the workflow task from the guided workflow to further enhance the web presence based at least in part on a cost input by the customer.

5. The systems as recited in claim 1, wherein the guided workflow employs a decision tree that directs a customer to choose one or more paths provided by the guided workflow.

6. The system as recited in claim 1, wherein the guided workflow is based upon conditional logic that permits a choice of a plurality of different paths provided by the guided workflow.

7. The system as recited in claim 1, wherein the guided workflow is based, at least in part, on a status of a ticketing process associated with the customer.

8. The system as recited in claim 1, wherein said host is at least one of a customer, a reseller, an affiliate, a customer of a customer, a domain registrar, a web services provider, a cloud services provider, a network services provider, an online services provider, and an internet service provider.

9. The system as recited in claim 1, wherein the guided workflow directs the user interface to provide questions related to a market associated with the customer type.

10. The system as recited in claim 1, further comprising:
a central command center that allows a host to present options to a customer to allow the customer to manage the customer's web presence,
at least one web presence enabling platform that enables web presence elements, and
an API module that takes input from the host and initiates actions on the web presence enabling platforms to enable the web presence.

11. The system recited in claim 10, further comprising:
generating a script of web presence enhancement tasks with the logic engine based on the selected guided workflow of web presence enhancement tasks and customer input applied to at least one of those tasks by the user interface;
determining a web presence enabling platform from the at least one web presence enabling platform that enables web presence elements associated with the area of improvement; and
causing the script to be executed on the determined web presence enabling platform to improve the current web presence.

12. The system as recited in claim 1, wherein the selected task is based at least in part on a time input by the customer.

13. The system as recited in claim 1, wherein the logic engine compares the current web presence of the customer with industry metrics to facilitate selection of task from the sequence of workflow tasks.

14. The system recited in claim 1, further including generating a script of web presence enhancement tasks with the logic engine based on the selected guided workflow of web presence enhancement tasks and customer input applied to at least one of those tasks by the user interface.

* * * * *